US007624421B2

(12) United States Patent
Ozzie et al.

(10) Patent No.: US 7,624,421 B2
(45) Date of Patent: Nov. 24, 2009

(54) METHOD AND APPARATUS FOR MANAGING AND DISPLAYING CONTACT AUTHENTICATION IN A PEER-TO-PEER COLLABORATION SYSTEM

(75) Inventors: Raymond E. Ozzie, Manchester, MA (US); George P. Moromisato, Cambridge, MA (US); Nimisha Asthagiri, Pasadena, CA (US); Wei Dai, St. Bellevue, WA (US); Alexei Evdokimov, Swampscott, MA (US); Mark Cote, Amesbury, MA (US); Adam Weiss, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 10/631,206

(22) Filed: Jul. 31, 2003

(65) Prior Publication Data
US 2009/0150968 A1    Jun. 11, 2009

(51) Int. Cl.
*H04L 29/00* (2006.01)
*H04L 29/02* (2006.01)
*H04L 29/06* (2006.01)
*H04L 29/12* (2006.01)

(52) U.S. Cl. .................. 726/1; 726/2; 726/3; 726/4; 726/8; 726/21; 709/201; 709/203; 709/205; 709/217; 709/218; 709/219; 709/223; 709/224; 709/225; 709/245; 713/168; 713/169

(58) Field of Classification Search .............. 726/1
See application file for complete search history.

(56) References Cited

U.S. PATENT DOCUMENTS

| 6,092,201 | A | * | 7/2000 | Turnbull et al. ............... 726/4 |
| 7,068,789 | B2 | * | 6/2006 | Huitema et al. ............. 380/277 |
| 7,430,747 | B2 | * | 9/2008 | Manion et al. ............... 719/328 |
| 7,493,363 | B2 | * | 2/2009 | Huitema et al. ............. 709/204 |
| 7,496,648 | B2 | * | 2/2009 | Manion et al. ............. 709/223 |
| 7,543,022 | B2 | * | 6/2009 | Kubsch et al. ............. 709/204 |
| 7,571,313 | B2 | * | 8/2009 | Messerges et al. .......... 713/156 |
| 2004/0148333 | A1 | * | 7/2004 | Manion et al. ............. 709/201 |

OTHER PUBLICATIONS

Security in Ad-hoc Networks; Anne Vanhala. 2000. CiteSeer.IST.*

(Continued)

*Primary Examiner*—Syed A. Zia
(74) *Attorney, Agent, or Firm*—Wolf, Greenfield & Sacks, P.C.

(57) ABSTRACT

Proper user-to-data associations are maintained in shared spaces created in a peer-to-peer collaborative system by means of a simplified and minimal user interface that permits users to easily authenticate other members of a shared space. In particular, support is provided for automatically building authenticated relationships even if users do not take the time to authenticate other users. When a user enters a shared space and views the contacts in that space, the display names of each contact are accompanied by distinctive icons that identify that authentication status of that contact. A mechanism is provided for resolving conflicts between contacts with the same display names to prevent confusion and contact "spoofing." Security policies can be established to provide a uniform approach to authentication. These policies can be set by a user or, alternatively, the policies can be set by an administrator.

31 Claims, 15 Drawing Sheets

OTHER PUBLICATIONS

"About Groove Accounts and Identities", Groove User's Manual, http://www.groove.net/pdf/v3.0_Users_Guide.pdf, Apr., 2002.

"Groove Contacts and Contact Directories", Groove User's Manual, http://www.groove.net/pdf/v3.0_Users_Guide.pdf, Apr., 2002.

"About Authenticating Contacts", Groove User's Manual, http://www.groove.net/pdf/v3.0_Users_Guide.pdf, Apr., 2002.

"Authenticating Contact Identities With Digital Fingerprints", Groove User's Manual, http://www.groove.net/pdf/v3.0_Users_Guide.pdf, Apr., 2002.

* cited by examiner

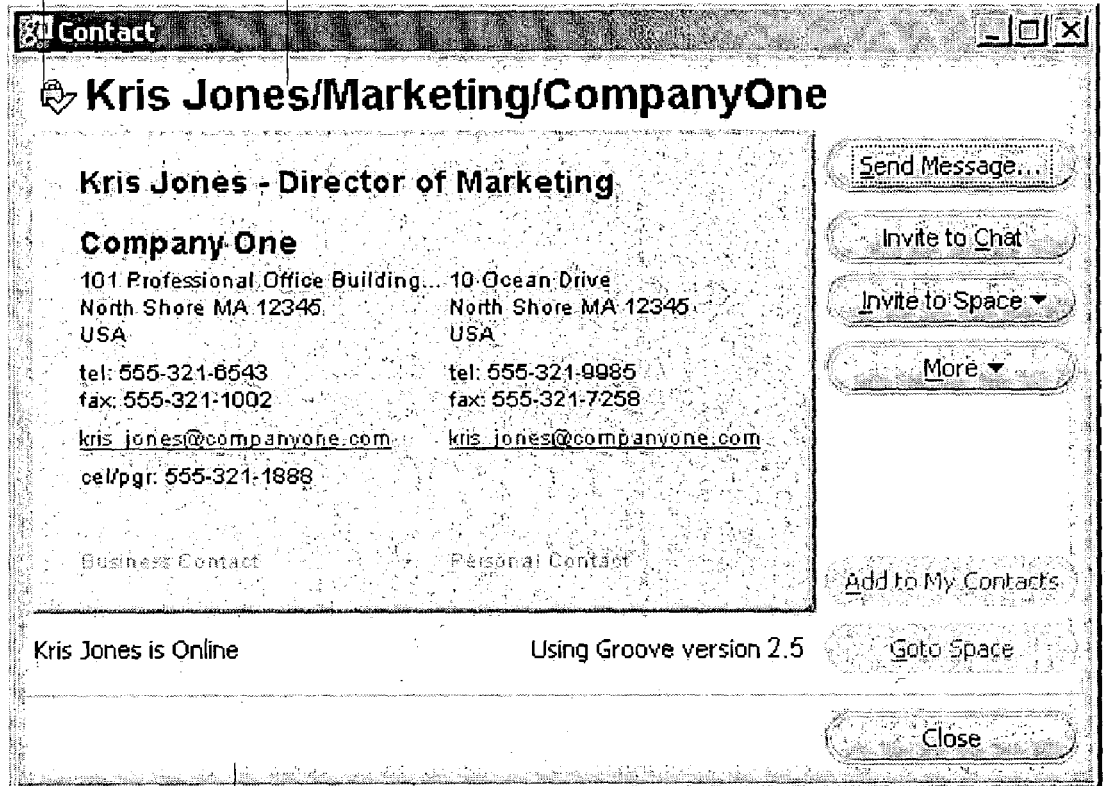
FIG. 3
 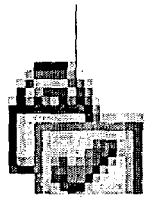  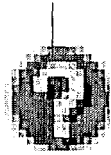
FIG. 4

Identity Policy

☑ [Identity Policy]
☐ Identity may only be used on a managed device in this domain
☑ Automatically publish vCard to management server directory.
☐ Prevent publishing of vCard to groove.net directory.
☐ Backup account every [ 1 ] day(s) (maximum 7).

Security Policy:
◉ Do not warn or restrict members when communicating with any contacts.
○ Warn member before communicating with contacts that have been neither administrator-certified nor manually authenticated by the member.
○ Only allow members to communicate with administrator-certified contacts.

[Submit]

METHOD AND APPARATUS FOR MANAGING AND DISPLAYING CONTACT AUTHENTICATION IN A PEER-TO-PEER COLLABORATION SYSTEM

FIELD OF THE INVENTION

This invention relates to peer-to-peer collaboration systems and to methods and apparatus for managing authentication relationships and automatically displaying these relationships to collaborators.

BACKGROUND OF THE INVENTION

Governments and other institutions, as users of networked computing systems, understand the value of security in protecting data from unauthorized disclosure. Government organizations, in particular, have gone to great lengths to encrypt data for privacy and to strongly authenticate users, so that participants in data exchanges can be assured of the identities of their communications partners. Furthermore, many organizations have instituted highly compartmentalized, private networks with firewalls that are either hardware or software barriers that prevent outside users from accessing data inside the firewall.

One drawback to this "island" network security approach is that it complicates the sharing of data with legitimate users in other organizations. Current organizational and business models demand interactivity and interdependency on consultants, workers, and people in other partnering organizations beyond the firewall. All of these people must cooperate, and even collaborate, in their everyday operations to respond quickly to emerging opportunities and threats. Today, the need to traverse organizational boundaries is greater than ever. The result of this tension—between strong data protection on the one hand and the need to share data on the other—can create obstacles to collaboration. Many organizations circumvent security measures entirely, for instance, sending data as email that often is not secure. Others may simply take no action.

Many organizations take good faith, but haphazard, approaches to solving the problem of data accessibility. Some network administrators open ports in the firewall to allow access by outsiders using selected protocols. Other administrators institute virtual private networks (VPNs) that allow known remote workers to tunnel into specific systems inside the firewall.

Still other organizations establish one or more systems in a network area known as a DMZ ("demilitarized zone"). A DMZ lies outside the main firewall of an organization and is accessible to people inside and outside the organization. For example, web servers often reside in a DMZ.

One problem with these solutions is that they require significant involvement by network administrators. Further, once these systems are implemented, administrators are left with the burden of maintaining them. Solutions like these also place a high degree of responsibility and trust on the shoulders of administrative personnel. Disregarding the potential for administrative compromise, such solutions are often highly customized, and not well documented. If a person who establishes some customized solution leaves an organization, others may not know how the system is configured. This can lead to security holes in otherwise secure networks.

Another set of problems with these solutions is their vulnerability to failures and focused attacks. Data robustness, data availability and methods to securely authenticate fellow collaborators are prerequisites for a secure system. Regardless of the strength of cryptographic protection, information must be available on demand.

In order to avoid heavy reliance on IT administrators while still maintaining good security, secure peer-to-peer collaboration systems have been developed. One of these is the Groove collaboration system developed and marketed by Groove Networks, Inc., 100 Cummings Center Suite 535Q, Beverly, Mass. 019015 that is described in detail at http://www.groove.net. See also U.S. Pat. No. 6,446,113 B1. In this system, a collaborator can create an account that contains "identities." An identity consists of a "cryptographic persona," which is two cryptographic "key pairs," each with a private and a public key. These keys are used to implement secure communications with other identities. Using an identity a collaborator can create ad-hoc collaborative places, called "shared spaces." A shared space is effectively a shared area or a secure partition in the user's computer memory that other collaborators can access. Such a shared space can be created using the user interface that is part of the Groove collaboration system. The shared space could also be created in other manners such as by creating a file folder or another type of file sharing arrangement. "Shared space" as used herein means such a shared area no matter how it is created. A collaborator creating a shared space can then invite other members to join the shared space and introduce data and tools to the space. The Groove system uses standard web protocols so that it can communicate through a firewall without requiring network administrators to open special ports in the firewall. In addition, organizations can deploy Groove servers for centralized management, relay functions, integration and control over Groove usage.

In order to provide security, the Groove system automatically encrypts all user accounts, shared spaces, and their contents locally using 192-bit encryption. Furthermore, all content and activity within a shared space that is sent across the network is also encrypted and can only be decrypted by other members of the shared space. However, even though all communications are encrypted and integrity protected, data origin integrity can only be insured if the users can easily verify that the real-world people with which they are communicating are, and remain, the actual people with whom the users think they are communicating.

In order to do this the Groove system uses a process called authentication. This process involves comparing "digital fingerprints" of contacts. In particular, the Groove system automatically generates a unique and unambiguous digital fingerprint associated with each identity. A digital fingerprint is derived from the public keys of a contact and is presented to the user as a long, random-looking string of letters and numbers (with punctuation marks for readability). Two people can manually authenticate each other's identities by comparing the fingerprints they view for each other against the fingerprints they report to each other.

For example, suppose a first user invites a second user to join a shared space. The first user reports his or her fingerprint to the second user, and the second user checks the reported fingerprint against the fingerprint that is displayed when the second user opens the first user's contact information in the member panel. Then the first and the second user repeat this operation, this time with the first user manually authenticating the second user's fingerprint. It is also possible for "certification" to be performed by administrators in managed domains as described below.

However, even with the authentication procedure, it is still possible for unauthenticated communications to occur. This unreliability occurs because users do not take the time to perform the authentication process, thereby opening the system to spoofing and other attacks.

SUMMARY OF THE INVENTION

In accordance with the principles of the invention, proper user-to-data associations are maintained across multiple devices (such as computers, PDAs, game consoles, set top boxes or other electronic devices) by means of a simplified and minimal user interface that permits users to easily authenticate other members of a shared space and to encrypt information. In particular, support is provided for automatically building authenticated relationships even if users do not take the time to authenticate other users. Once these relationships are established, they are stored in the data associated with a shared space. When a user enters that shared space and views the contacts in that space, distinctive icons accompany each contact. These icons instantly identify that authentication status of that contact.

In one embodiment, users may be "implicitly" authenticated. For example, when a first user communicates with a second user for the first time, even if the first user does not manually authenticate the second user, the security system still remembers the second user's contact information in the first user's account. As long as that contact remains in the first user's account, the first user is assured that all future communications with the second user are carried out with the same second user. To support this implicit authentication, the security system uses a technique called "name conflict resolution." The user interface includes features to warn users when contacts with similar names are presented. Therefore, the first user is adequately warned if and when another user is masquerading as the second user by using the same name as the second user.

In another embodiment, name conflicts are resolved by a technique called "aliasing."

In still another embodiment, security policies can be established to provide a uniform approach to authentication. These policies can be set by a user or, alternatively, the policies can be set by an administrator. The policies provide for a preferred, or required, authentication method. Based on the selected policy, the collaborative system can warn a user when the user is about to communicate with people that are not administrator-certified or people that have not been manually authenticated.

In yet another embodiment, based on the selected policies, the collaborative system can disallow communications with individuals unless their contact identity is administrator-certified or manually authenticated.

BRIEF DESCRIPTION OF THE DRAWINGS

The above and further advantages of the invention may be better understood by referring to the following description in conjunction with the accompanying drawings in which:

FIG. 3 is a screen shot of a contact display illustrating detailed contact information and an authentication indicator.

FIG. 4 shows a set of illustrative icons that can be displayed to indicate contact authentication status and display name conflicts.

FIG. 10 is a screen shot of a display screen that allows an administrator to set s security policy for one or more identities.

DETAILED DESCRIPTION

Figure 1A:
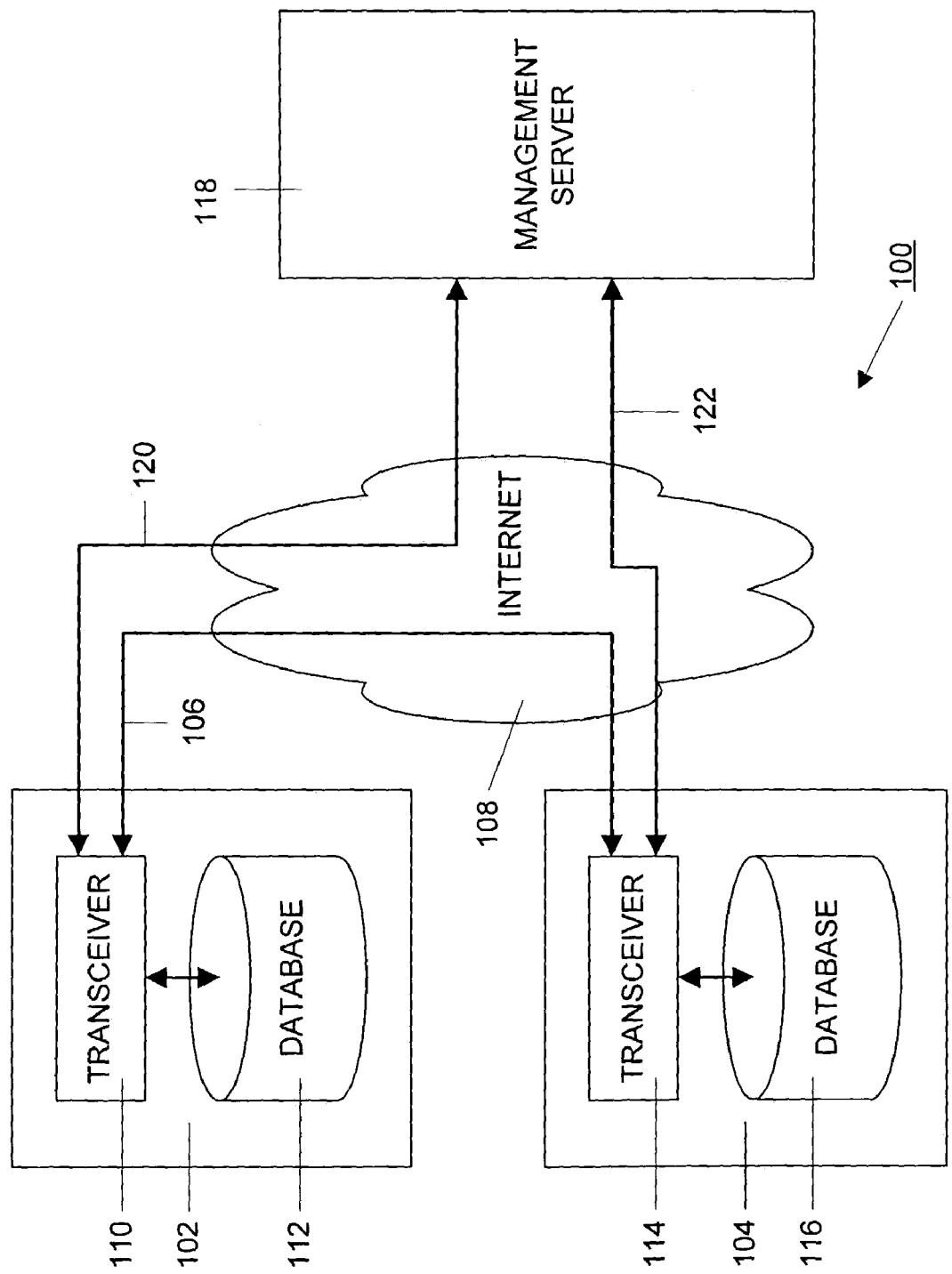
FIG. 1A is a block schematic diagram of an illustrative collaborative system wherein each collaborative computer includes a transceiver and database.

FIG. 1A is a block schematic diagram of a collaborative system 100, such as the aforementioned Groove collaboration system. FIG. 1A shows two collaborating devices 102 and 104 that can be computers, PDAs, laptop computers, set top boxes, web-enabled cell phones or other communication devices. Although only two collaborating devices are shown additional devices may also be present. When the Groove software is loaded onto such devices, it creates a database such as databases 112 and 116 in devices 102 and 104, respectively. These databases each hold a local copy of data that is being processed by the collaborators. As discussed below, the databases 112 and 116 also hold information regarding the operation of each of the collaborating devices 102 and 104.

The collaborative software also creates a transceiver, such as transceivers 110 and 114 in the devices 102 and 104, respectively. Each transceiver is responsible for generating and sending data change requests, called "deltas", between collaborators as indicated schematically by arrow 106. Typically, these data change requests are sent over the Internet 108 as shown in FIG. 1A, but they could also be sent over another network such as a LAN network. The data change requests are used for a number of purposes such as adding and removing collaborators from the system and updating the local data copies in each collaborating device in order to keep the data copies in synchronization.

FIG. 1A also shows a management server 118 that can be used by administrative personnel to establish management domains and managed identities. Typically the management server 118 also communicates with the collaborating devices via a network, such as the Internet 108, as indicated schematically by arrows 120 and 122. The operation of the management server and its use in creating and managing domains is described more fully in copending U.S. patent application Ser. No. 10/036,275, filed on Oct. 24, 2001, by William D.

Tierney and Kenneth G. Moore and entitled "METHOD AND APPARATUS FOR MANAGING A PEER-TO-PEER COLLABORATION SYSTEM", which application is incorporated in its entirely by reference herein.

Figure 1B:
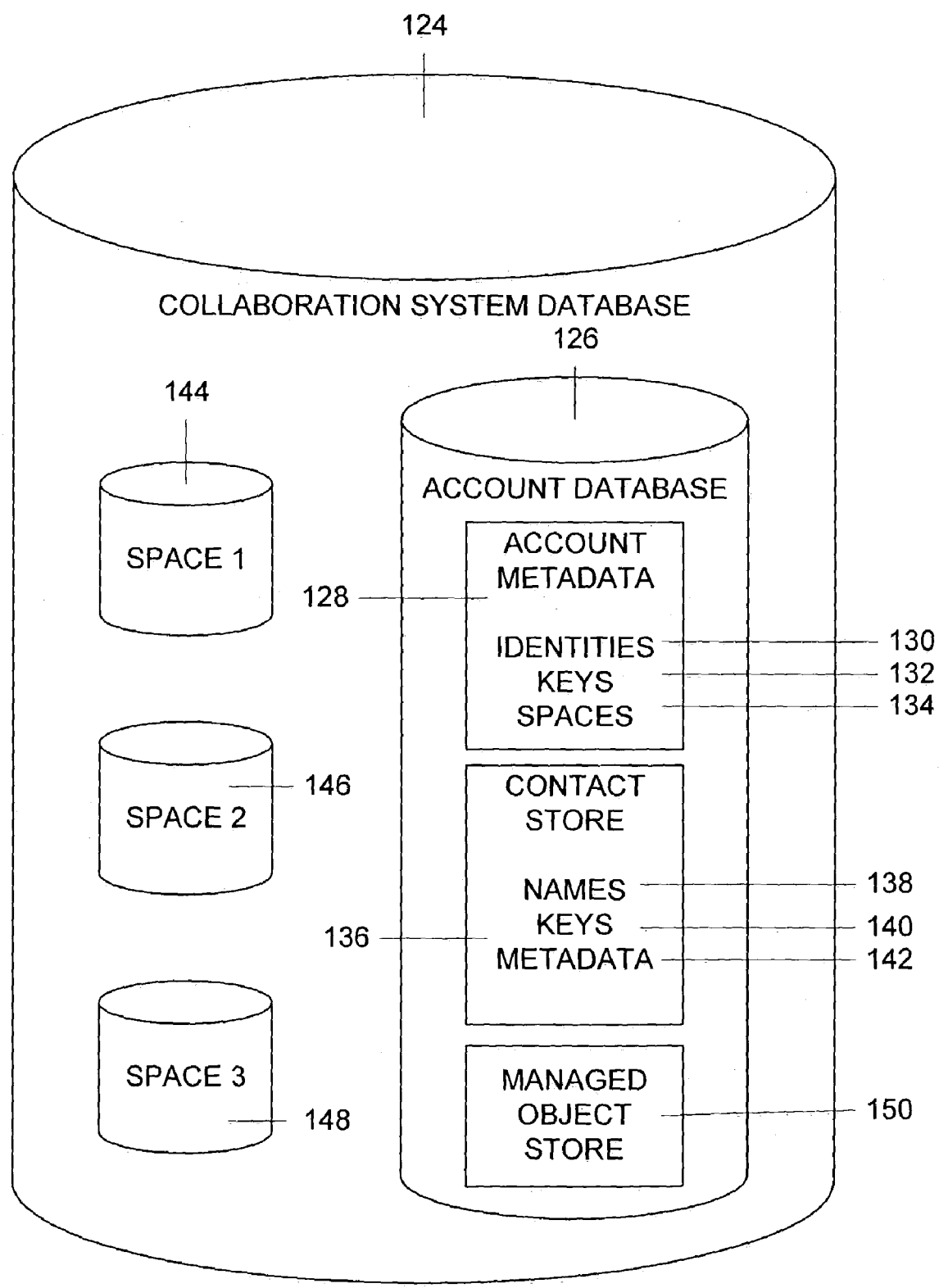
FIG. 1B is a block schematic diagram of a collaboration system database including the shared space stores, the account metadata store and the contact store.

In order to use the aforementioned collaborative software, a user establishes an account. Such an account includes information about the user such as a login in name and passwords and may include additional information such as e-mail addresses and other ways to contact the user. In general, an account corresponds to user information files commonly found in other system such as identity files, etc. An account includes information stored in a database, such as databases 112 or 116, maintained by the collaborative system. Such a database 124 is illustrated in more detail in FIG. 1B. The system database 124 includes an account database 126 that, in turn, stores certain user-private metadata about the account. A user may have multiple identities, such as a professional identity for use in the office and a personal identity for use with family and friends for purposes like sharing pictures or vacation plans. The metadata includes data for one or more identities 130 held by the account and private keys 132 associated with the identities. Each identity is associated with two key pairs called "identity key pairs". The metadata further includes identifiers 134 for each shared space associated with the account.

The account database 126 also includes a contact store 136 that stores contact information for each identity. The information for each contact includes individual and professional identity display names, phone numbers, email addresses, etc. The contact information also contains some public information, such as the public keys of public/private key pairs 140 used for verifying and encrypting messages between identities outside of the collaborative system. The contact information also includes metadata 142 that comprises status flags, which indicate the authentication status of the contact. This metadata also includes the minimum expiration date of all certificates in a "certificate chain" for the contact (the contact may be certified by another contact which is, in turn, certified by yet another contact, etc.). For performance reasons, the collaborative system validates the certificate chain once and then simply stores the minimum expiration date. Later, before the contact is displayed in the user interface, the minimum expiration date is checked, but the certificate chain does not need to be re-validated. This procedure allows the collaborative system to be up-to-date in terms of certificate expirations.

The status flags indicate whether the contact is unauthenticated, has been manually authenticated or has been administrator certified. As described below, these flags cause selected icons to be displayed on the user interface so that the authentication status of each contact is immediately obvious. In accordance with the principles of the invention, and as described below, the metadata also includes name conflict information that allows users to recognize and deal with identities that have the same display name.

The collaborative system enables users to create and join shared spaces, which are private areas within which users can collaborate. A user typically has access to multiple spaces with each space having a different set of participants (called "members"). Further, each user can maintain some shared spaces on multiple devices such as a workstation at work, a desktop computer at home, and a laptop for mobile use. Shared spaces contain data and tools contributed by members of the space and are dynamic: users will join and leave; data will grow and shrink; tools will come and go; the space's lifetime can be ephemeral (just a few minutes), or the space can persist on a continuing basis forever.

In order to maintain security in such a collaborative system, user identities are bound to the real-world people using the identities by authentication and encryption techniques, thereby ensuring the confidentiality and integrity of data as it propagates through the system. Authentication is performed by the collaborative system in two separate steps. In the first step, the system authenticates users within the system by correctly associating electronic identities with the human users they represent. Once this is done, the collaborative system performs the second authentication step by correctly associating an action within the system (such as a modification to a file, a chat message, a keystroke) with an electronic identity.

The initial association of a user with his or her computer identity begins when the collaborative software is first configured on a device. The first configuration step is to create an account store (an encrypted XML object store such as database 126), which includes attributes defining that user. Some account attributes are listed below in schematic XML form.

```
account
    {identities}
        identity_1
            {spaces}
            private signing key (for Identity 1)
            private encryption key (for Identity 1)
            storage master key
            contact information (for Identity 1)
                id-url
                public key algorithms
                public signing key
                public encryption key
                devices
                relay server
                status word
        identity_2
    {known contacts}
```

In this sample XML file, each indentation indicates a hierarchy and an account may contain multiple identities, for example, a personal Identity and a professional identity. Each identity has its own unique parameters, including sets of keys and contact information. The keys include a private signing key that is part of a public/private key pair used for signing documents. Each contact includes further information including contact identification information, such as a URL, public key algorithms, a public signing key, a public encryption key, devices, the relay server used by the contact and the aforementioned status word.

The configuration process that creates the account store asks the user to create a "passphrase." that contains upper and lower case letters, punctuation, and numerals to make it hard to guess. This pass phrase is then used to protect master keys used to decrypt keys for individual shared spaces (collectively, called "storage master keys"), that, in turn, are used to encrypt the information in the account store.

More specifically, the system then uses the pass phrase along with a random "salt" value as input to a password-based key derivation function, such as the Password Based Key Derivation Function #2 (PBKDF2) that is described in RFC 2898 at URL http://rfc-2898.rfcindex.com/rfc-2898-27.htm and standard PKCS#5 v2.0 maintained by RSA Laboratories, Inc. and described at http://www.rsasecurity.com/rsalabs/pkcs/pkcs-5. This function generates a symmetric key for use with an algorithm that encrypts the storage master keys. This symmetric key exists only temporarily in memory, is zeroed after use, and is never sent over the wire. The same pass phrase used on another device will generate a different symmetric key due to the random salt value added to the PBKDF2 function. Dictionary attacks on the pass phrase are also deterred by the addition of the salt value to the PBKDF2 input, since the salt value changes whenever the password changes. In addition, a delay of a tenth of a second is built into the process. This delay is hardly noticeable during legitimate logins, but it adds up during dictionary attacks, making them infeasible.

Illustratively, the algorithm used to encrypt the storage master keys could be an algorithm such as the Advanced Encryption Standard algorithm (AES). AES is a United States approved standard for a symmetric encryption algorithm, replacing the DES algorithm. The AES algorithm was originally called Rijndael and was developed by two Belgian cryptographers. It is described in detail at http://csrc.nist.gov/encryption/aes/ and at FIPS 140-2. The storage master keys are used to protect other keys. There are two main master keys and both are 256-bit symmetric keys used for encryption with the AES algorithm. One master key protects user security metadata keys (a user's private signing and decryption keys) and the pother master key protects user's data encryption keys (keys that protect shared-space data). Data stored in each shared space is encrypted by a distinct (per-database) 192-bit symmetric AES key. A corresponding (per-database) derived 192-bit HMAC key provides database integrity protection.

Private keys are also associated with the identities held by the account (an account can hold multiple identities). Each identity is associated with two key pairs (called "identity key pairs"): (1) a 2048-bit, asymmetric RSA key pair used for signing messages (instant messages and shared space invitations/acceptances) outside the context of a shared space. (RSA stands for Rivest, Shamir and Adleman—after the three cryptographers who invented the first practical public key cryptosystem. The RSA public key algorithm is the most commonly used public key algorithm today. It is fully described at http://www.rsasecurity.com/.)

This key pair also signs the per-space signing keys that use (1) the ESIGN algorithm and (2) a 2048-bit, asymmetric ElGamal key pair used for encryption (of symmetric keys used to protect messages outside of the context of a shared space). ESIGN is a royalty-free, public-key signature algorithm developed in Japan. It is now being standardized by IEEE and is described at http://info.isl.ntt.co.jp/esign/. The ElGamal algorithm is a public key encryption algorithm that provides an alternative to the RSA public key algorithm. It is described in detail in an article entitled "A public key cryptosystem and a signature scheme based on discrete logarithms", T. ElGamal, Advances in Cryptology—Proceedings of CRYPTO'84, Springer Verlag Lecture Notes in Computer Science 196, pages 10-18, 1985.

When a user creates a shared space, the collaborative system adds information about the space in a separate shared space database (such as databases 144, 146 and 148 in FIG. 1B) that is protected with a space-specific database key and then generates various keys for that space. These latter keys are also added to the shared space security metadata database. Later, when a user opens a shared space, a storage master key is used to decrypt the keys contained within the shared space database security metadata. These latter keys include a storage database encryption key which is a 192-bit per-space symmetric key that encrypts stored shared space data. This key also derives a 192-bit per-space symmetric key that integrity-protects stored space data. The space comes with a group key for the space, which is a shared 192-bit symmetric key that dynamically derives a group encryption key for the space and a group message authentication (MAC) key that insures the integrity of shared space data transmitted on the wire via transmission units called "deltas". The space group key is distributed to new members during the invitation protocol described below. The space group key is re-keyed (changed) when a member is uninvited from the space.

The shared space database also includes a member signature private key, which is a 1536-bit asymmetric ESIGN key used by this member in this space to sign deltas and messages sent within the context of a shared space. The public half of this key pair is sent in an "add member" delta protocol described below. Public keys of all members are maintained in the shared space database as well. The shared space database further includes a shared space member Diffie-Hellman private key which is a 2048-bit asymmetric key used by this member in this space for pair-wise key establishment between each pair of members in a shared space. The Diffie-Hellman algorithm is described in detail in PKCS #3 available at RSA Laboratories at the web site located at URL http://www.rsasecurity.com/rsalabs/pkcs/. The public half of this key pair is signed by the user's identity signature private key and distributed to the entire group in the invitation protocol described below. The public parts of the Diffie-Hellman keys of all members are maintained in this database as well.

The shared space database also includes a pair-wise key. In particular, with each member of the shared space, each user shares a distinct 192-bit symmetric key for deriving two other temporary pair-wise keys. The derived keys are used to encrypt (using the 192-bit AES algorithm) and integrity protect (using a 192-bit HMAC SHA-1 hash algorithm. Details of this algorithm are described in FIPS 180-1 at the web site located at URL http://www.itl.nist.gov/fipspubs/fip180-1.htm) messages (such as delta fetch requests) targeted to single users in the space. The space member pair-wise key derives from Diffie-Hellman key agreement between each pair of members in the space (using the space member Diffie-Hellman key).

At this point, the user has created an electronic identity. However, other users must still verify that the just-created electronic identity truly belongs to the user by a process called authentication. Otherwise, someone pretending to be the user could mount a "man-in-the-middle" attack, intercepting all communications between the user and another user by pretending to be both the user and the other user.

There are several ways that other users can be authenticated. For example, users can manually authenticate other users. To manually authenticate another user, a user visually examines a "digital fingerprint" of the public key of the other user. Digital fingerprints are hexadecimal strings generated dynamically using a cryptographically strong hash algorithm to hash a user's public keys. One hash algorithm that is suitable for use with the invention is the aforementioned SHA-1 algorithm. The reason that digital fingerprints are used instead of public keys is that they are easier for people to read than public keys, yet just as secure. A user's public key, which the collaborative system uses to generate the digital fingerprint and to verify signatures on messages, is stored in a user's contact information, that is, in turn, stored on central directory servers or on local directory servers, where the information is readily available to other users. Contact information is also included in "invitations" sent to others to invite them to join a shared space. Invitations are discussed in more detail below. Thus, public key information is readily available for generating a digital fingerprint.

Figure 2:
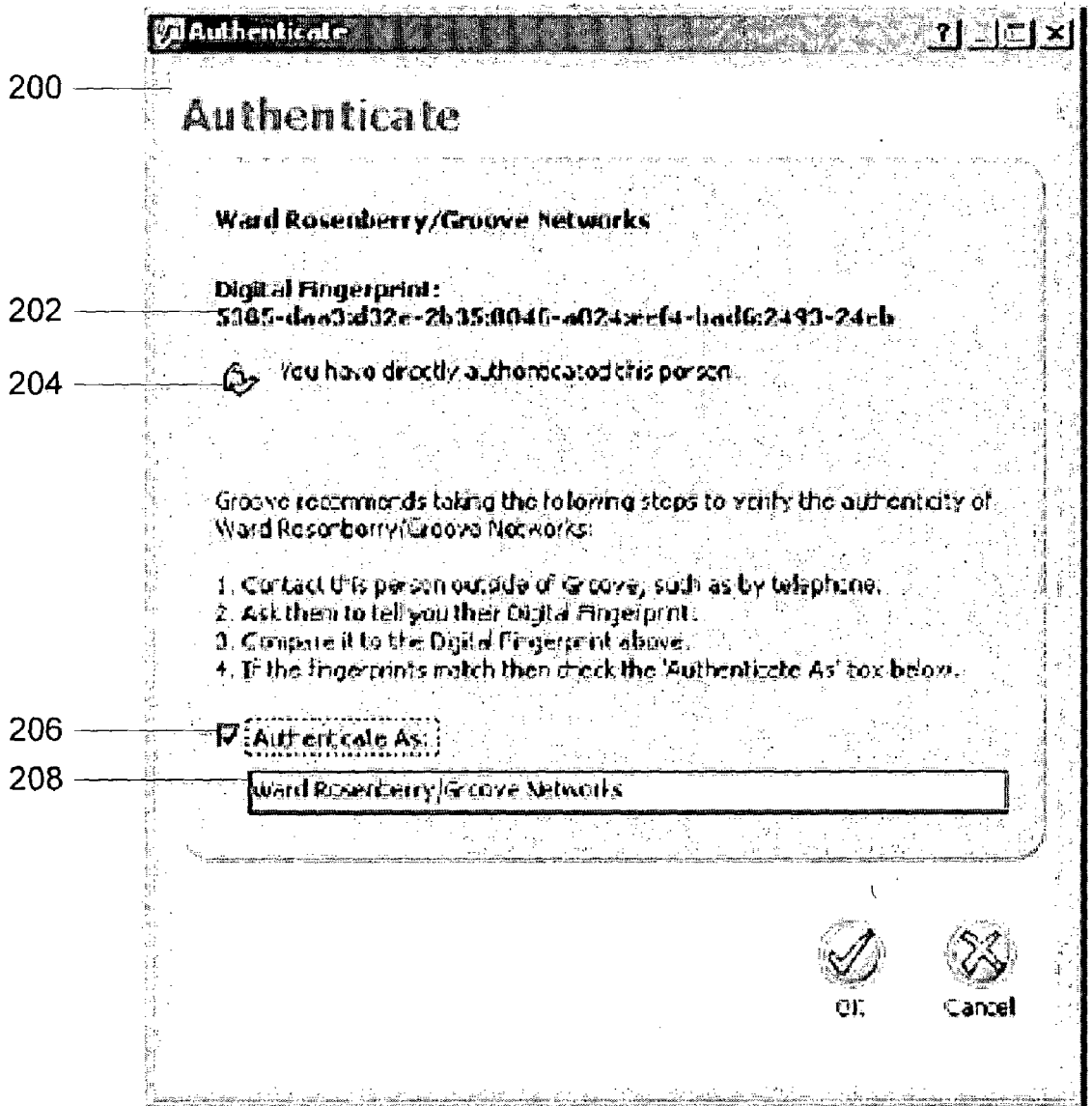
FIG. 2 is a screen shot of a display screen used for manually authenticating contacts.

Manual authentication involves contacting a person using an out-of-band means, such as a phone call, to obtain their fingerprint value. In particular, the collaboration system automatically calculates a digital fingerprint for each user. This fingerprint can be displayed to that user. Further when a new contact is added to the account information, the collaborative system uses the public key information of this contact to calculate a digital fingerprint for that contact. This latter digital fingerprint is displayed in an authentication screen of which a screen shot is illustrated in FIG. 2. The user then contacts that contact, using the out-of-band means and requests that contact's digital fingerprint. The user then compares the requested digital fingerprint to that displayed in the authentication screen and, if the fingerprints match, indicates that this contact has been authenticated by checking the "Authenticated as" box. Note that the contact is authenticated under a particular name. This authentication process prevents the following attack by an authenticated user (M): User A authenticates user M. User A now sees M as authenticated with an authentication icon. Authenticated user M now changes his or her display name to match the display name of another user B. User A now sees an authentication icon next to M's contact but with B's display name. User A would be thus "spoofed" into thinking that he or she is communicating with authenticated user B, when in fact he or she is communicating with user M.

Some users belong to "managed" environments. In these environments administrators set some policy aspects with the help of a management server. For example, administrators may set policies on a "domain" or group level. Per-domain and per-group policy administration provide flexibility in setting security controls and operational parameters across larger environments. Policy controls include passphrase strength, restrictions to specific tools or software versions, and restrictions on the number of shared spaces or the ability to create shared spaces.

In managed environments, administrators use a management server to manage devices and identities through the distribution of policy data to the managed entities. For example, a security policy can be individually set for each administrative domain or group (a named subdivision of a domain) within an organization. Policies set the behavior of managed devices controlling things like passphrase composition, and expiration, and whether members can create multiple accounts, or unmanaged identities. Users can be restricted to downloading specific tools or software versions and they can be constrained to download only signed components from specific publishers. Thus, managed environments offer great flexibility in structuring meaningful policies across an organization.

In managed environments where users have managed identities, the collaborative system supports automatic authentication by relying on certificates (signed contact information) provided by a "certification authority." For example, the Groove Enterprise Management Server functions as a certification authority, where the collaborative software presents user contact information (that includes locally-generated public keys) to the management server so that they can be certified by the server. Each management server administrative domain within an enterprise acts as a certification authority (a management server may have multiple administrative domains and thus multiple certification authorities). The public key of the certification authority is securely transmitted to users along with their certificates. This affords users an in-band means to authenticate one another within their domain, by using the Enterprise Management Server certification authority as their common certification authority. Cross-domain authentication is enabled using cross-domain certificates containing the public key of the foreign management server domain. Management server administrators manage these certificates if this capability is needed.

Wherever the collaborative system displays a contact name, an authentication indicator called a "certification/authentication icon" may precede the name showing its authentication status. An authentication indicator displays with a contact if the contact has been manually authenticated or if the user has a managed identity and the contact is a member of the user domain or a cross-certified domain. A contact identity is considered "unauthenticated" if it is neither manually authenticated, nor certified by an administrator. An illustration of a contact identity with an accompanying authentication icon is shown in FIG. 3. FIG. 3 illustrates a screen display 300 of contact information for a contact with an identity named "Kris Jones/Marketing/Company One" 302. This screen shot illustrates an authentication icon 304 displayed preceding the contact name. There are three different authentication icons that identify the authentication status of a contact. Illustrative examples of these icons are shown in FIG. 4.

The manual authentication indicator 400 signifies that the contact has been manually authenticated. In addition to contacts that a user has manually authenticated, this indicator is displayed next to the user's own active, deleted, or disabled identities. An illustrative certification authentication indicator 402 for intra-enterprise contacts is also shown in FIG. 4. When this icon is displayed before a contact name, it indicates that the contact is managed and the contact belongs to the same domain as the user viewing the icon or belongs to another domain in the user's organization that is a cross-certified with the user's domain. If a contact is certified and is also manually authenticated, only the manual authentication indicator and not a certification indicator will be displayed. The third authentication indicator 404 is a certification indicator for inter-enterprise contacts. This icon indicates that the contact is managed and belongs to a domain outside of the user's organization, which is cross-certified with the user's domain. In one embodiment, this icon 404 is color-coded to clearly distinguish it from the intra-enterprise authentication indicator 402.

In accordance with the principles of the invention, the collaborative system provides support for automatically building authenticated relationships by a process called "implicit authorization." In accordance with this process, when a first user communicates with a second user for the first time in the system, even if the first user does not manually authenticate the second user and if the second user is not certified, the collaborative system still stores the second user contact information including the second user's public keys in the first user account database. From then on, the system checks the public key information of each contact so that the first user is assured that all future communications using the second user contact information are with the same second user. However, no authentication icons will precede the display of the second user name in the display of the contact information since the second user has not been manually authenticated or administrator certified.

Figures 5A, 5B, 5C:
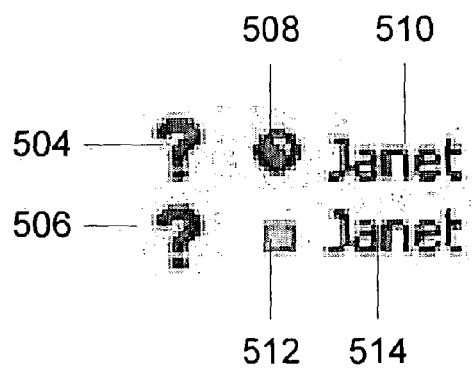
FIG. 5A is a screen shot of a contact name display illustrating a display name conflict.
FIG. 5B is a portion of a screen shot of a contact name display illustrating the use of name conflict icons to highlight a display name conflict.
FIG. 5C is a portion of a screen shot of a contact name display illustrating the use of aliases to resolve a display name conflict.

One problem that arises with the implicit authentication scheme described above is that identities are associated with a user-chosen name. In particular, although every identity is unique, the name that users choose to represent their identities on user interface displays does not have to be unique. For example, suppose two people activate an account and enter "Janet" for their display name. This will create two unique identities that happen to use the same display name. Another user might then look up "Janet" in a public address book and find it listed twice as shown in FIG. 5A. As shown in FIG. 5A, both contacts would be listed with identical display names 500 and 502.

Therefore, it is possible that two contacts with the same or similar names will be confused or that an impostor will use the name of a legitimate contact in order to initiate a communication with another user. In order to insure that this confusion does not occur, the collaborative system performs a process called "name conflict resolution." This process provides a special user interface display icon to warn users when contacts with similar names are presented. Thus, when implicit authentication is used, a user will be warned, if, and when, one user is masquerading as another user by using the same display name.

In particular, when two or more contacts have equivalent display names, the collaborative system displays a warning, such as a question mark icon 406 (FIG. 4), in the graphical user interface in place of the authentication icons discussed above and next to each of the display names of the two identities that have conflicting names 504, 506 as shown in FIG. 5B. The system considers display names equivalent if two (or more) "clean names" match exactly. A clean name is generated from the contact display name by (1) trimming leading and trailing spaces, (2) compressing multiple embedded spaces, (3) removing punctuation, and (4) converting all text to lowercase UNICODE characters.

Figure 6A:
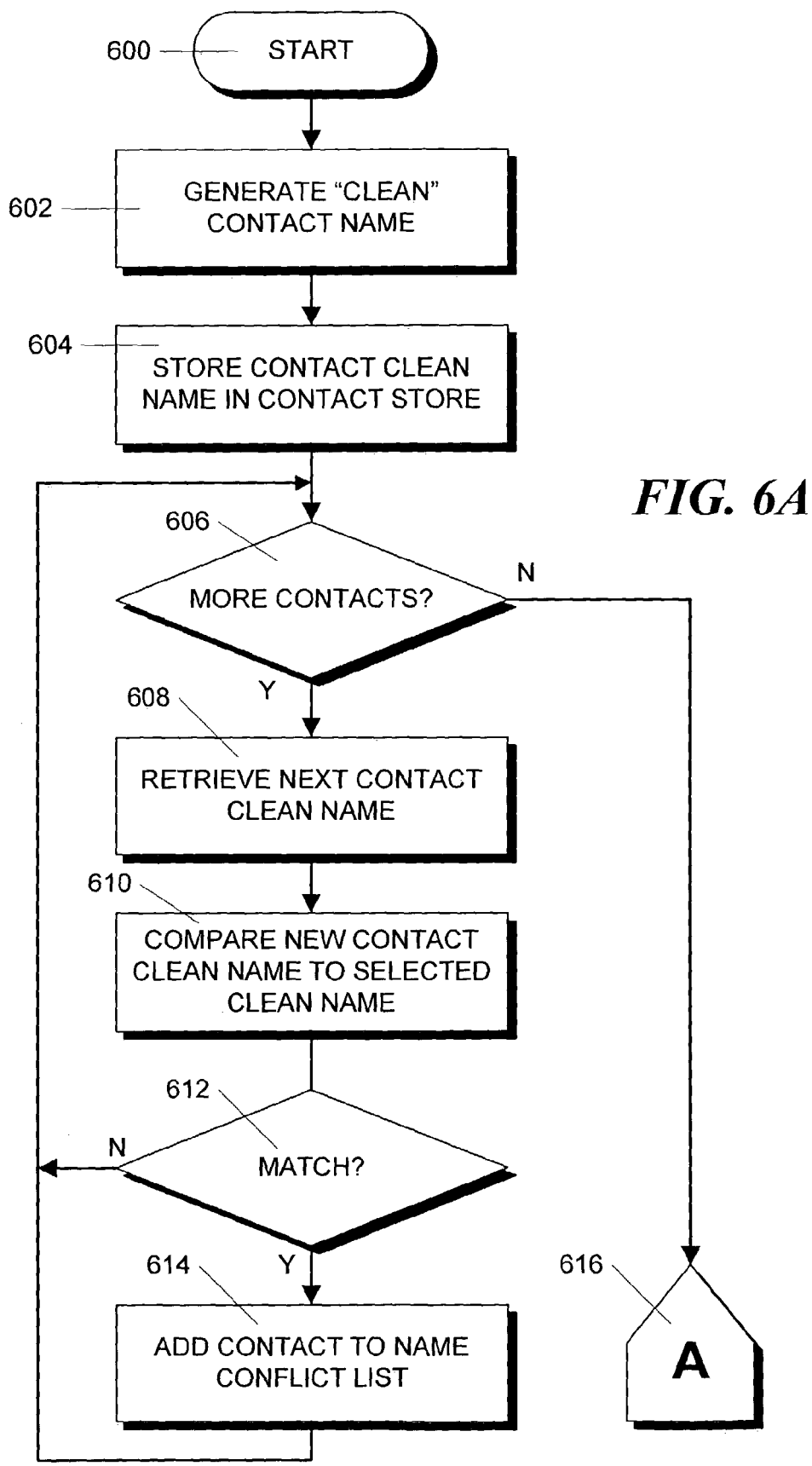
FIGS. 6A-6C, when placed together, form a flowchart that shows the steps in an illustrative process for determining when name conflict icons should be displayed with contact display names.
Figure 6B:
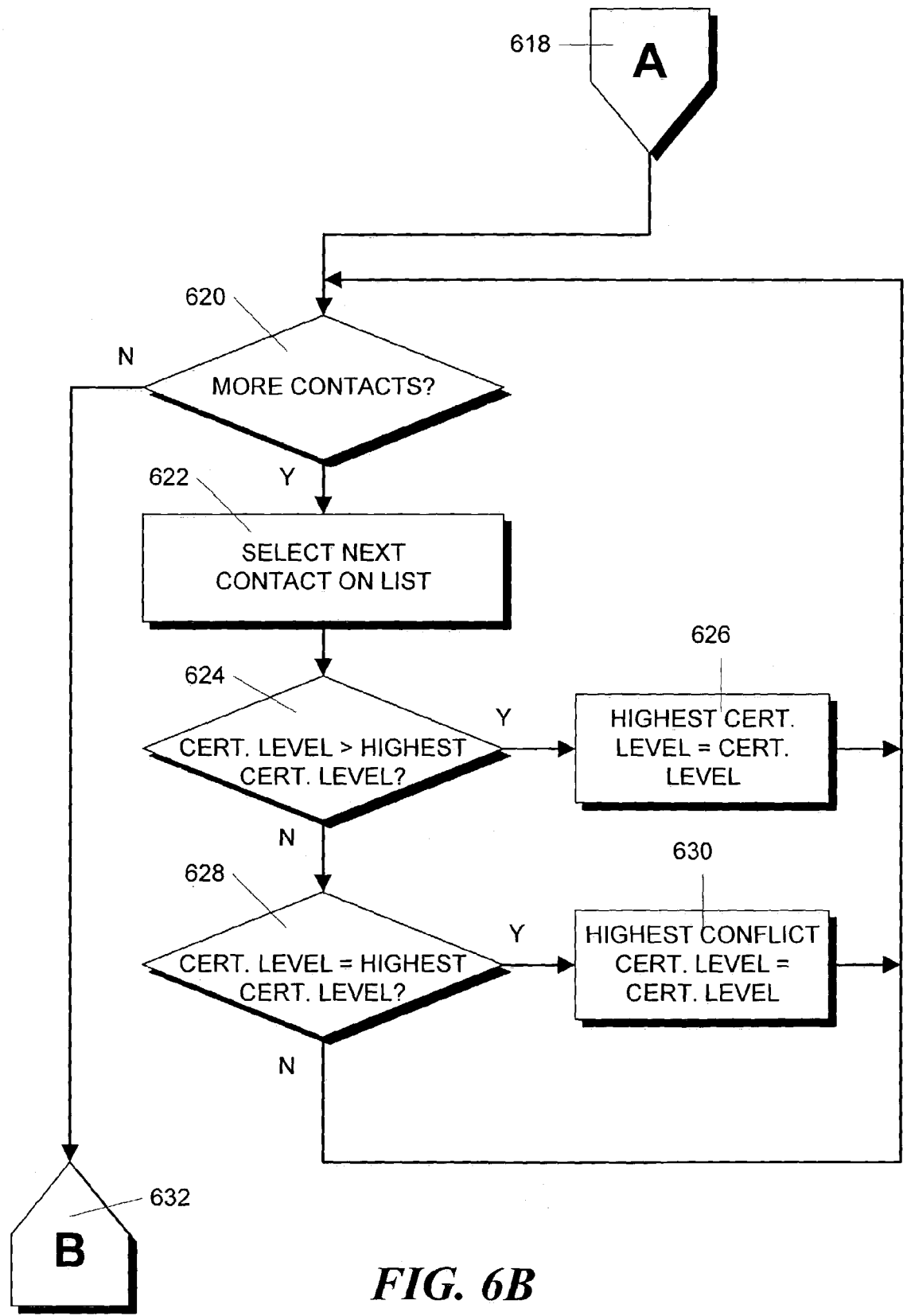
Figure 6C:
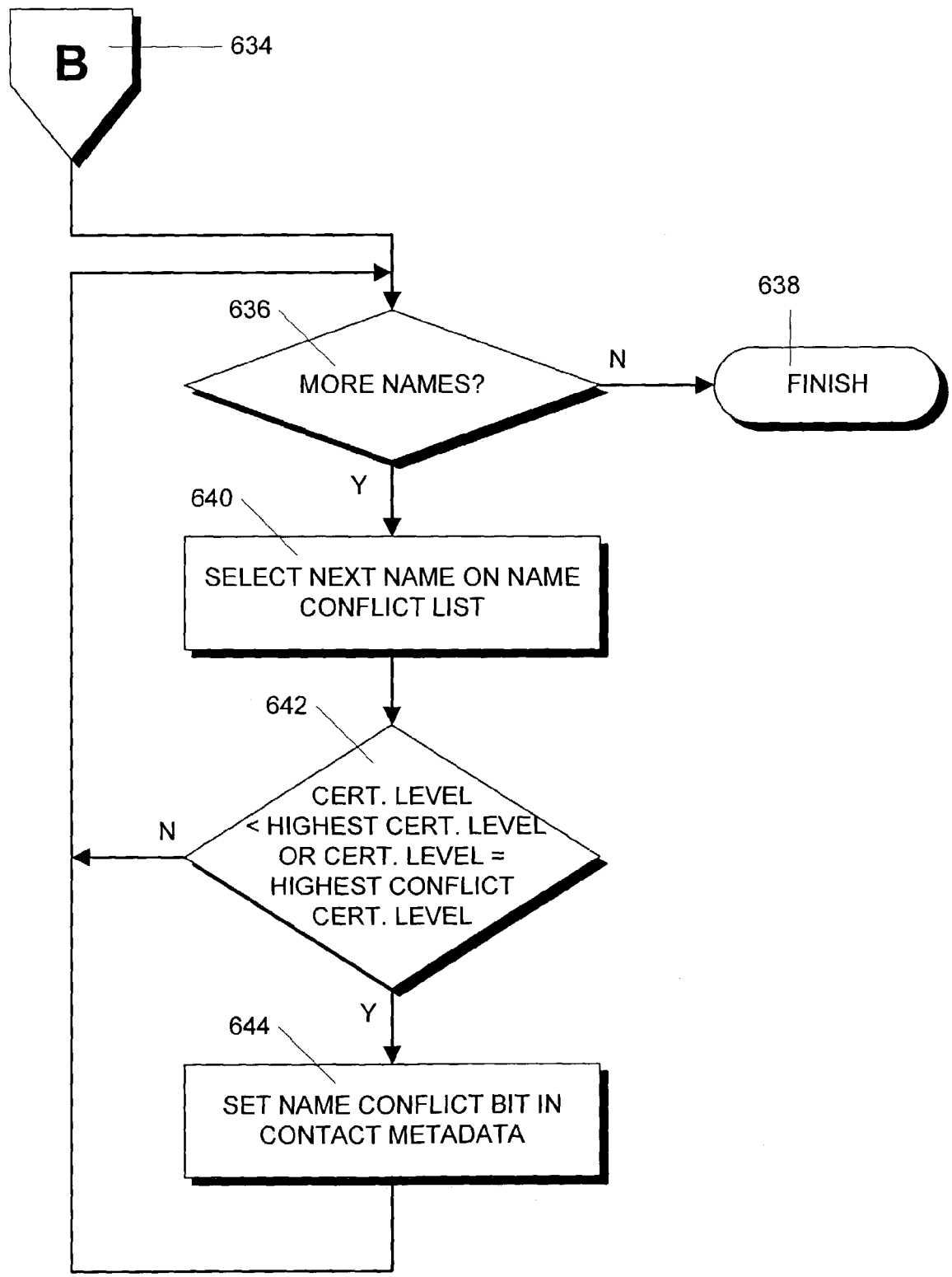

The process of comparing display names is shown in FIG. 6. In particular, as described above, each collaborative system account has a "contact store" which maintains contacts and their metadata, including display names. The store contains contacts obtained from sources, including, but not limited to, a user's personal contact list, contacts obtained from member lists of shared spaces, contacts obtained from contact tools in shared spaces, and contacts from the "To" and "From" fields of instant messages.

Whenever a new contact is added to the store, this process begins in step 600 and proceeds to step 602 where the new contact display name is pre-processed by generating the aforementioned clean name. This clean name is included as part of the metadata that is stored with the new contact in step 604.

The clean name is then compared to the clean names for all contacts in the contact store, including the new contact. In order to expedite this process, clean names are stored in the metadata for each contact in the contact store. These stored clean names are then compared to the clean name for the new contact to determine whether the names are equivalent and to generate a name conflict list. In particular, in step 606, a check is made to determine whether additional clean names to be compared remain in the contact store. If no additional names remain, then the name contact list is complete and the process proceeds, via off-page connectors 616 and 618, to step 620 where processing continues as described below.

Alternatively, if additional names remain to be processed as determined in step 606, then the process proceeds to step 608 where the next contact is retrieved from the contact store and, in step 610, the clean name for that contact is compared against the new contact clean name.

If there is a match as determined in step 612, then that contact is added to a name conflict list as set forth in step 614. The process then returns to step 606 to determine whether additional names in the contact store remain to be checked. Alternatively, if in step 612, no match is detected, the process then returns to step 606 to determine whether additional names in the contact store remain to be checked.

When all contact names have been checked, processing continues at step 620, as discussed above. In steps 620-642, a determination is made whether name conflict bits in the metadata of contacts with clean names that conflict with the new contact clean name will be set. When a name conflict bit for a contact is set, then a name conflict icon will be displayed wherever and whenever the contact display name is displayed in the collaborative system's user interface.

The determination whether the name conflict bit will be set is based on a comparison of authentication/certification levels of the contacts. As mentioned above, each contact is assigned one of four certification levels: (1) manually authenticated; (2) intra-enterprise certified; (3) inter-enterprise certified, and (4) unauthenticated. Manually authenticated is the highest level. For the contacts on the name conflict list prepared in steps 606-614, these levels are compared in steps 620-628. In step 620, the name conflict list is checked to determine whether any contacts on the list have not been processed. If contacts remain to be processed, then the process proceeds to step 622 where the next contact on the list is selected for processing. In step 614, the authentication/certification level of the selected contact is compared to a highest certification level variable that holds the highest authentication/certification level of the contacts that have been processed. If the authentication/certification level of the selected contact is higher than the value of the variable, then, in step 626, the value of the variable is set to the authentication/certification level of the selected contact and the process proceeds back to step 620 to determine if additional names on the list need processing.

If, in step 624, it is determined that the authentication/certification level of the selected contact is not higher than the value of the highest certification level variable, then the process proceeds to step 628 where the authentication/certification level of the selected contact is compared to the highest certification level variable and, if the authentication/certification level of the selected contact is equal to the highest certification level variable, then the value of another variable, the highest conflict certification level variable, is set to the authentication/certification level of the selected contact. The process then returns back to step 620 to determine if more contacts on the conflict list remain to be processed. Alternatively, if, in step 628, it is determined that the authentication/certification level of the selected contact is not equal to the value of the highest certification level variable, then the process simply returns directly back to step 620.

Finally, the conflicts on the conflict list are again examined in order to set the name conflict bits in the metadata associated with selected contacts that have conflicting display names. This process is performed in steps 636-644. In particular, when in step 620, it is determined that no additional contacts remain to be processed, the process proceeds, via off-page connectors 632 and 634, to step 636 where the name conflict list is checked to determine whether any contacts on the list remain to be processed.

If more contacts remain to be processed, then the process proceeds to step 640 in which the next contact on the list is selected. Then, in step 642, the authentication/certification level of the selected contact is compared to the values of the highest certification level variable and the highest conflict certification variable determined in steps 620-630. If the authentication/certification level of the selected contact is less than the value of the highest certification level variable or equal to the value of the highest conflict certification level variable, then the process proceeds to step 644 in which the name conflict bit in the metadata of the selected contact is set and the process returns to step 636 to process additional contacts. Otherwise, in step 642, the process returns directly to step 636 to process additional contacts. When all contacts have been processed as determined in step 636, the process finishes in step 638.

The aforementioned authentication/certification level comparison is performed in order to mitigate denial of service attacks from "name-spoofing" attackers. For example, assume a malicious user (M) attempts to cause confusion in communications between authenticated (or cross-certified) users P and Q by creating a temporary identity Q' whose display name matches the display name of the real user Q. User M then sends user P an instant message posing as user Q. Since the display names of contacts Q and Q' match, without the authentication/certification level comparison, user P would see name-conflict icons appear alongside the display names of contacts Q and Q'. User P would then be required to resolve the name conflict as described below. This process would have to be repeated over and over if M kept sending messages from identities Q", Q''', Q'''', etc that all use the same display name as the real contact Q. However, by performing the additional authentication/certification level checking described above, the collaborative system favors contact Q over contact Q' and will not display a name-conflict icon associated with the display name of contact Q. Therefore, the display allows user P to easily identify the rogue contact.

Whenever a contact is removed from the contact store, steps 600-644 are performed for that contact in order to remove name conflicts that no longer exist and to redo the additional authentication/certification level checking.

In order to resolve a name conflict that is indicated by conflict icons, a user can open a Resolve Name Conflict dialog box by right-clicking on a display name that has a conflict indicator associated with it. This action opens a drop-down list and the user can then select a "Resolve Name Conflict" option from the list.

Figure 7:
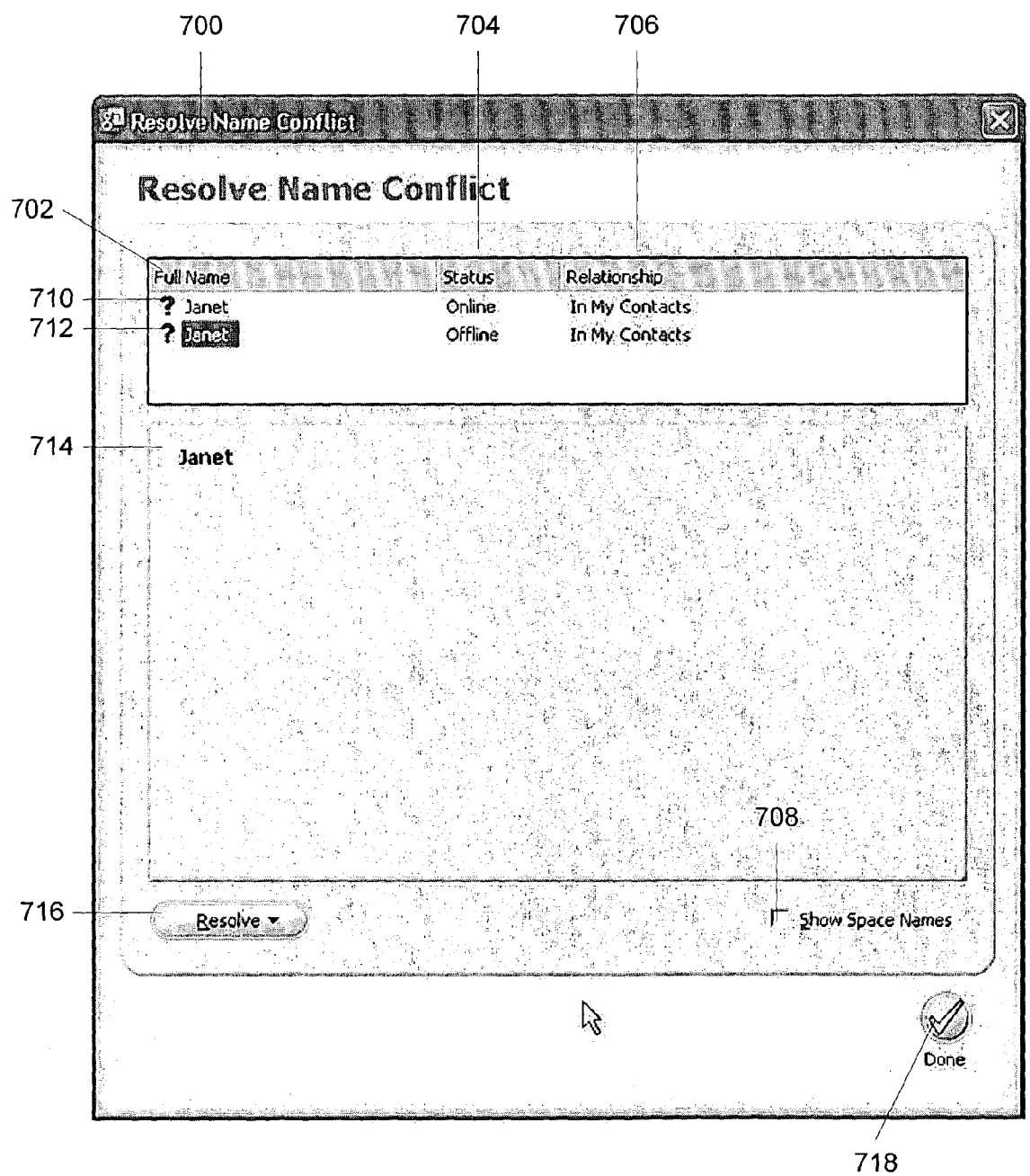
FIG. 7 is a screen shot of a screen display that is used to resolve display name conflicts.

The selection of the Resolve Name Conflict option causes the collaborative system to locate and display all contacts in the user's contact store with the same "clean name" as the selected name. These latter contacts are displayed in a list 702 of a Resolve Name Conflict dialog box 700 as shown in FIG. 7. For example, the list 702 displays the two aforementioned contacts 710 and 712 with the conflicting display names "Janet." This list also shows the status 704 (on-line or off-line) of the contact and the relationship 706 of the contact to the user. A check box 708 is provided to additionally display the names of all shared spaces in which conflicting contacts are found. Selecting one of the names in the list 702 (for example, name 712) causes the name to be displayed in edit box 714 along with information contained on the contact's "vCard."

The user can then resolve the name conflict by either assigning to the contact an "alias" display name that replaces the conflicting display name or by manually authenticating the contact (which process, in turn, requires that an alias display name be assigned to the contact). An alias is simply another display name that is assigned to a contact to help a user distinguish that contact from other similarly-named contacts. In particular, the user can activate the Resolve drop-down list 716 by clicking on it and then selecting either an "Alias" option or an "Authenticate" option.

Figures 8, 9:
FIG. 8 is a screen shot of a dialog box used to assign an alias to a display name.
FIG. 9 is a screen shot of a contact name listing showing a displayed alias and contact authentication indicators.

Selecting the Alias option displays the Alias dialog box 800 shown in FIG. 8. This dialog box 800 displays the full name 802 of the contact and has a textbox 804 into which the user can enter a unique display name for the contact and then confirm the name by selecting either the "OK" command button 806 or the "Cancel" command button 808. Alternatively, selecting the authenticate option from the drop-down list 716 displays the authenticate dialog box illustrated in FIG. 2.

In the example described above in which two contacts exist both with the display name "Janet", a user might want to create an alias "Janet (my sister)" for a relative and another alias "Janet (my manager)" for a business contact. Users must assign a unique alias display name to each contact, so that aliased contacts will never have display name conflicts. If a contact with the same display name as an alias display name later is added to the contact store, the new contact display name will be associated with a conflict icon, but an aliased and authenticated contact display name will not have a conflict icon associated with it because of the aforementioned preferential treatment of authenticated/certified contacts. When an alias has been selected for the contact in the Resolve Name Conflict dialog box 700, selecting the "Done" command button 718 causes the collaborative system to replace the contact display name with the alias. The alias 902 then appears in the contact list 900 in place of the original display name as illustrated in FIG. 9. The alias also appears in all other contact lists as shown in FIG. 5C that illustrates the aliases 516 and 518. In one embodiment, the alias will be the same on all other devices within the user's account. Also, the alias will generally not be visible to other members.

Even with the procedures described above, the robustness of the security system depends heavily on user compliance with the established authentication and certification procedures. In order to increase the security of the system, in accordance with the principles of the invention, security policies can be implemented either by a user or, in the case of managed identities, by a system administrator. A security policy for an identity controls how the collaborative system permits that identity to communicate with other identities. In particular, the collaborative system can warn a user when the user is about to communicate with people that are not administrator-certified, meaning they do not have managed identities and are not part of a certified domain, or with people that have not been manually authenticated.

Illustratively, several options are provided to warn users or disallow communications with individuals unless their contact identity is administrator-certified or manually authenticated. These may include options such as those set forth in Table 1.

TABLE 1

| Security policy | Limitations |
| --- | --- |
| Open | The collaborative system does not warn about or restrict communications with unauthenticated or uncertified identities. |
| Warn-if-unauthenticated | The collaborative system warns a user about communications with unauthenticated identities (that is, contacts who have been neither administrator-certified nor manually authenticated) by displaying the Authenticate dialog box. This security setting does not prevent communications with unauthenticated identities, but prompts a user to manually authenticate the identities before continuing. |
| Refuse-if-uncertified | The collaborative system refuses to communicate with all uncertified identities even if the user has manually authenticated those identities. |

Security policies affect the behavior of the collaborative system during communication activities. For example, the aforementioned, the "warn-if-unauthenticated" policy affects activities in the manner illustrated in Table 2 Note that Table 2 is not inclusive. Other operations with a new contact could also cause the system to display the Authenticate dialog.

TABLE 2

| Communication activity | Security behavior |
|---|---|
| Sending instant messages and shared space invitations (including chat and forwarding instant messages) | If any recipients have unauthenticated identities, the collaborative system displays the Authenticate dialog box for a user to manually authenticate the identity of these recipients. If the user chooses not to manually authenticate these recipients, the user must remove them from the To: field before continuing. |
| Confirming shared space invitations | If a person with an unauthenticated identity accepts a shared space invitation and a user has designated "required acceptance confirmation" for the invitation, the collaborative system displays the Authenticate dialog box when the user confirms the invitee's acceptance. |
| Opening a shared space | If any shared space members have unauthenticated identities, the collaborative system displays the Authenticate dialog box. |
| Creating a shared space | If a user creates a shared space and invites people with unauthenticated identities, the collaborative system displays the Authenticate dialog box. |
| Fetching a shared space | If a user attempts to fetch a shared space from a member with an unauthenticated identity, the collaborative system displays the Authenticate dialog box. |

The "refuse-if-uncertified" policy affects communication activities in the manner shown in Table 3 (as with Table 2, Table 3 is also not inclusive):

TABLE 3

| Communication activity | Security behavior |
|---|---|
| Sending instant messages and shared space invitations | If any recipients have uncertified identities, the collaborative system displays a message stating that the user cannot communicate with uncertified identities. |
| Confirming shared space invitations | If a person with an uncertified identity accepts a shared space invitation and a user has designated "required acceptance confirmation" for the invitation, the collaborative system declines the acceptance and does not send the shared space. |
| Opening a shared space | If any shared space members have uncertified identities, the collaborative system displays a message stating that a user cannot participate in a shared space with these members. |
| Creating a shared space | If a user creates a shared space and attempts to invite people with uncertified identities, the collaborative system prevents the user from inviting these people. |
| Fetching a shared space | The collaborative system does not allow a user to fetch a shared space from any member with an uncertified identity (uncertified members are not listed in the Fetch From: drop-down menu). |

If the "refuse-if-uncertified" security policy is applied to a managed identity, the user with the managed identity can still manually authenticate other contact identities. However, that user cannot communicate with the manually authenticated identities if they are not also administrator-certified. If a user wants to communicate with identities which have been only manually authenticated, then the user must use an identity to which "refuse-if-uncertified" policy has not been applied.

Multiple identities in the same account can have different security policies assigned to each identity. For example, a user might have a managed identity at his or her office with a "refuse-if-uncertified" security policy applied and might also have an unmanaged identity in the same account for use at home with no identity security policy applied. Additionally, it is possible to have an account with multiple identities, each with a different level of authentication with respect to a given identity. When this happens, the collaborative system displays the highest authentication/certification relationship that the account has with the given identity.

Different levels of authentication may happen, for example, if there is an account with multiple managed identities, each from a different management domain. In this case, each management domain may have differing cross-certification settings with a given domain.

If an identity is managed, the security policy is set by an administrator using a management server. In order to enact security policies, the administrator must define identities for a domain or group and then make these identities managed in a conventional fashion. Then the administrator uses a user interface on the server to set the policy. To set identity policies for a domain or group, the administrator opens a domain/group window and selects the management domain or group and then selects a "policies" tab and an "edit identity policies" link or other similar selection mechanisms.

The identity policy page 1000 shown in FIG. 10 is then displayed. An enable policy checkbox 1002 appears if policies are being set for a domain. Checking the box specifies that current identity policy settings apply to the domain. Unchecking the box specifies that the default identity settings will apply to the domain.

The "identity may only be used on a managed device" checkbox 1004 specifies that managed identities in the selected domain or group can only be used on managed devices. Unchecking this checkbox allows managed identities to be used on any device, managed or not.

The "automatically publish vCard to management server directory" checkbox 1006 specifies that the management server should automatically publish the managed identity and vCard information of domain/group members to the management server local directory of domain members.

The "prevent publishing vCard to groove.net directory checkbox 1008 specifies that the management server should NOT publish the managed identity and vCard information of domain/group members to the groove.net public directory on the groove.net Web site.

The "backup account every (1) day(s) (maximum 7)" checkbox 1010 specifies how often the management server will automatically back up user accounts for managed identities in the domain. A number from 1 to 7 can be entered into the text box to specify the number of days between backups. Leaving the text box empty disables this policy and accounts will not be backed up.

The next section on display 1000 specifies the peer authentication policy. This policy determines how the management server handles client communication with unauthenticated contacts. Selecting the "Do not warn or restrict members about communicating with any identities" radio button 1014 sets the "Open" policy discussed in Table 1 and allows members to communicate freely with unauthenticated contacts without the management server generating any warning information.

Selecting the "Warn members before communicating with contacts that have been neither administrator-certified nor manually authenticated by the member" radio button 1016 set the "Warn-if-unauthenticated" policy in Table 1 and allows members to communicate with unauthenticated users, but the management server issues warnings as described above before such communications are attempted.

Selecting the "Only allow members to communicate with administrator-certified contacts" radio button 1018 sets the "Refuse-if-uncertified" policy of Table 1 and prevents members from communicating with uncertified identities.

When all selections have been made, the "Submit" command button 1020 can be selected. The selected identity policies are then automatically disseminated to devices in the domain using the managed objects described below. If users are offline, their policies will be updated by the managed objects the next time they come online.

Figure 11:
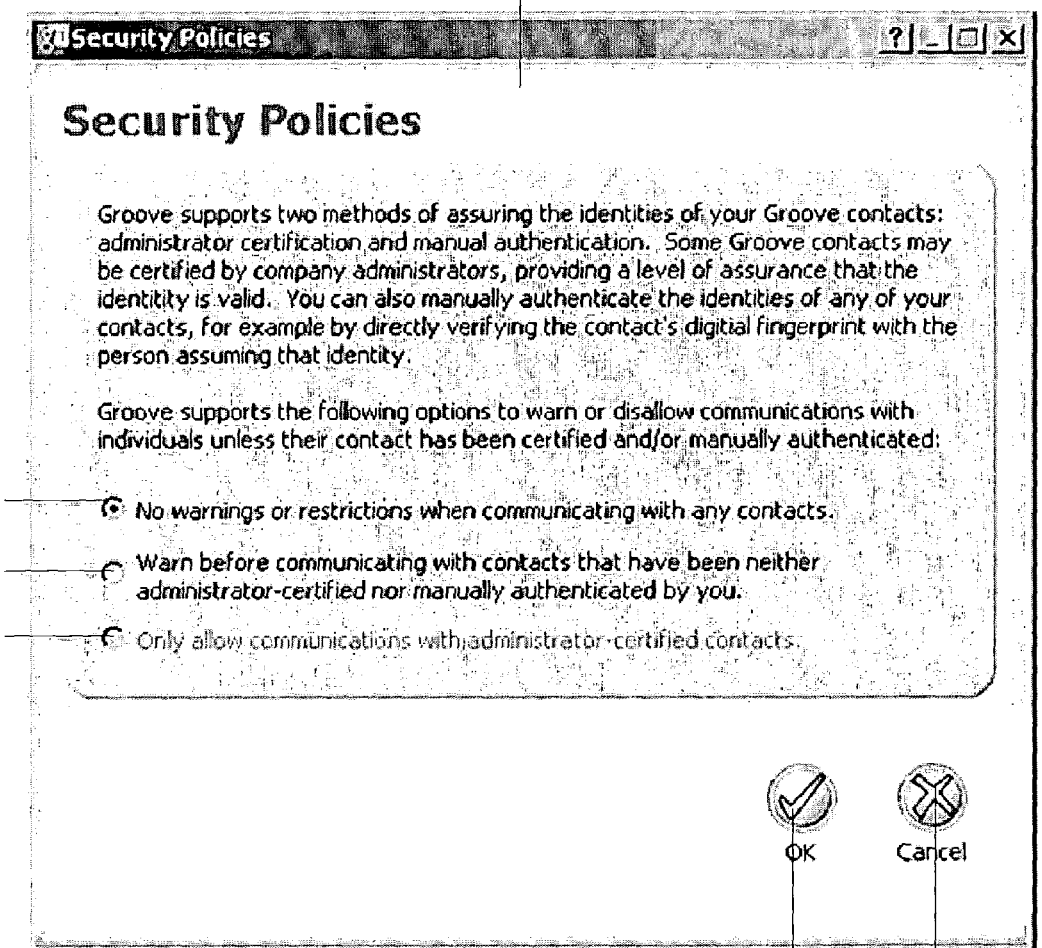
FIG. 11 is a screen shot of a display screen that allows a user to set or review the security policy that applies to that user.

In addition, users that are not part of a managed domain may set their own security policies by means of a user interface display screen 1100 such as that shown in FIG. 11. Security policies can be set (or reviewed, if the identity is a managed identity) by a user by selecting the appropriate radio button 1102, 1104 or 1106. If the identity is managed, buttons 1102, 1104 and 1106 will be disabled since security policy for a managed identity is controlled by the administrator. If the identity is unmanaged, buttons 1104 and 1106 will be enabled, but button 1108 will be disabled (as shown in FIG. 11) since this selection is always administrator controlled.

Domain security policies are implemented by "managed objects" sent from the management server to a user account. In particular, security policies are included in an "identity policy" object. Such an object is generated on the management server and may or may not have an intended user (a specific identity) at generation time. After the management server generates a managed object, either (a) the server "injects" the object into an account or (b) an end-user associated with the account can click on a representation of the object to manually inject the object into an account. Managed objects that are injected into an account are stored in a managed object store (150, FIG. 1B) inside an account.

In any case, after an injection of a managed object, some identity in the account would be marked as an actual user of the object (for reporting purposes). If the collaborative system can match the intended user with one of the identities in the account, that identity will be associated with the managed object; otherwise the account owner can select an identity if there is more then one identity in the account.

Each time anyone injects a managed object, the collaborative system reports this fact to the management server along with the identity of the actual user of the object (so that administrator personnel can determine who injected the object and who did not inject the object). The server also has the ability to revoke managed objects. In particular, each time a user asks for a managed object, this fact is reported to the management server, along with the actual user of the object (so that administrative personnel can determine who is actually using the managed object, and revoke the object for a particular user, if necessary).

In order to generate a managed object, selected information is provided to the management server. The server then generates the object in the form of an XML document. Some information is included in the object header. This information includes a name (globally unique) identifying the managed object. For example, illustrative names include "grooveLicense://Core/GrooveProfessional" or "grooveAccountPolicy://DataRecovery" or grooveIdentityPolicy:///."

Managed object information also includes information identifying the object issuer. This might include company identification, in a form of globally unique URN (for example "urn:groove.net:") A management domain is also provided, including the management server URL, and management domain name (which is unique for the given server.) The information further includes private keys and the certificate of the management domain that are used to sign the object, and optionally, an intended user of the managed object. Optionally a body of the managed object may also be provided A schema for an XML document that embodies a generalized managed object is shown below:

```
<!--
  - optional attributes are enclosed in □
  - optional attribute default values are after //=
  - optional elements are noted as such
-->
<g:ManagedObject
   Version="0,0,0,0"
>
   <g:Header
      GUID="<GUID>"
      Name="<name>"
      DisplayName="<display_name>"
      Description="<description>"
      IssuedTime="<issued_time>"
      [DeviceSpecific="1|0"]                                        //="0"
      [ReplacementPolicy="$Never|$Always|$IssuedTime"] //="$Never"
      [IntendedIdentityURL="<intended_identity_URL>"] //=""
   >
      <!-- expiration is optional, default is none -->
      <g:Expiration>
         <g:TimePeriod
            Value="<value>"
            [Baseline="$IssuedTime|$InjectionTime"
//="$InjectionTime"
            [Limit="<limit>"]                           //=none
         />
      </g:Expiration>
      <g:Issuer
         Name="<name>"
         DisplayName="<display_name>"
      />
      <g:ManagementDomain
         Name="<name>"
         DisplayName="<display_name>"
         ServerURL="<server_URL>"
      />
   </g:Header>
   <!-- body is optional -->
   <g:Body
      ComponentResourceURL="<component_resource_URL>"
   >
      <!-- whatever data is needed by a particular type of a
managed object should be in the body element below -->
      <g:body_element>
      </g:body_element>
   </g:Body>
   <g:Signatures>
      <g:Signature Value="<value>" Fingerprint="<fingerprint>"/>
   </g:Signatures>
</g:ManagedObject>
```

In the header portion, the GUID attribute is a globally unique identifier for the managed object and is generated with each newly-generated managed object. The name attribute identifies a managed object and is not the display name discussed above. Managed object names are URLs, where the scheme part of the URL is a managed object type, and the remainder is specific to that particular managed object type. For example, grooveLicense://groove.net/;Division=Core, Product=Groove is a name for license managed object, where the "grooveLicense" part is a managed object type for licenses. At any point of time, a managed object store can have at most one managed object with a given name.

The DisplayName/Description attribute is the human-readable display name/description for the managed object. The IssuedTime attribute specifies the managed object issued time. The DeviceSpecific attribute determines whether the managed object applies to the whole device. If this attribute is "1," the managed object is device-specific and applies to the whole device, such as a component download policy.

The ReplacementPolicy attribute indicates when an existing managed object can be replaced by another managed object with the same name. The collaborative system honors the replacement policy that is specified in the replacement managed object, rather than the replacement policy in the to-be-replaced managed object. Possible values for this attribute are $Never—the managed object never can be replaced, $Always—the managed object always should be replaced and $IssuedTime—the managed object can be replaced by another managed object with a more recent issued time. The default of this attribute is $Never.

The IntendedIdentityURL attribute specifies an intended (as opposed to actual) identity URL for a managed object. The Expiration attribute defines when a managed object expires, and can no longer be used. A duration attribute can be specified for an expiration time period, for example, 30 days. This value is relative to a baseline that is specified by a Baseline attribute. The Baseline attribute for an expiration time period specifies when the start of the expiration time period occurs and has two possible values: $IssuedTime specifying that the baseline is the managed object issued time and $InjectionTime specifying that the baseline is the managed object injection time. If not specified, then the value $InjectionTime is the default. An expiration time can also have a Limit attribute that allows a total time limit to be imposed on when a managed object expires, regardless of any other conditions. This is an absolute value that is not relative to a baseline.

The Issuer attribute identifies a managed object issuer. The issuer name and display name should be specified, and the name must be globally unique. The Management domain attribute identifies the management domain for a managed object. The name, display name, and server URL of the management domain must be specified, where the server URL points to a management server, and the name must be unique within the scope of that server.

The body portion of the schema contains a component resource URL that specifies what component is handling the body of this object and a body element that contains opaque data that is determined by a particular object type As mentioned above, the security policy for an identity is contained in an identity policy managed object. An illustrative name for such an object is grooveIdentityPolicy://<GUID>. An illustrative ComponentResourceURL attribute is http://components.groove.net/Groove/Components/Root.osd?Package=net.groove.Groove.SystemComponents.GrooveAccountMgr_DLL&Version=0&Factory=IdentityPolicy.

An illustrative schema of the body element of the identity policy managed object is shown below. In this schema, all elements are optional, except for the <g:Policy> element.

```
<g:Policy [Flags="<flags>"] [PeerAuthenticationLevel="<level>"]>
    <g:Contact>
        <g:VCard [ChangeFlags="<vCard_change_flags>"/]>
        <g:Policies>
            <g:DirectoryListings>
                <!-- may have 0+ elements like the one below -->
                <g:DirectoryListing
                    Name="<directory_name>"
                    Value="<directory_listing_value>"/>
            </g:DirectoryListings>
        </g:Policies>
    </g:Contact>
    <g:Backup Interval="<interval_in_days>" />
    [<g:Telespaces DefaultTemplateComponentResourceURL="<>"/>]
    <g:AttachmentRestriction
        AllowOnly="<true|false>"
```

-continued

```
        Size="<size_in_kb>"
        FileType="<list_file_ext>"
    />
</g:Policy>
```

An illustrative value of the Flags attribute is "0x1" indicating that this identity can only be used on devices from the management domain associated with the identity. The PeerAuthenticationLevel attribute can have three possible values, including "0" indicating that no warnings or restrictions are issued when communicating with any contacts. This illustratively would be the default behavior. The value "1" indicates that the system should warn a user of unauthenticated contacts and a value "2" indicating that the system should restrict a user from communicating with uncertified contacts.

Illustratively, the value of the vCard_change_flags is "0x2" indicating that a user cannot change business fields. The directory_name attribute can have several values such as $GrooveNet specifying that the directory should be the Groove.net contact directory and $ManagementDomain specifying that the directory should be a contact directory for the management domain associated with the identity.

The values of the directory_listing_value attribute can be "0" indicating the user decides whether the contact listing will be published. Alternative values include "1" specifying that the contact listing should always be published and "2" specifying that the contact listing should never be published.

The value of the DefaultTemplateComponentResourceURL attribute is the component resource URL for the shared space template. The AttachmentRestriction element has an attribute AllowOnly that can have several values. These values include the value "0" or "false" indicating that the attachment list is an exclusion list and file types on the list are not allowed. Alternatively the attribute can have the value "1" or "true" indicating that the attachment list is an inclusion list and only the types on the list are allowed. The value of the size_in_kb attribute specifies the maximum numerical size of a file in kilobytes. The value of the list_file_ext attribute a delimited list of file extensions that are allowed, for example "exe", "vb" or "dll."

When a client receives a policy object (or in general, a managed object), the client first verifies that the policy object is signed by its management domain. Device-wide policies (such as for component downloads) are verified using the public key of the device's management domain. Identity-wide policies are verified using the public key of the identity's management domain. The key pair used for signing managed objects is separate from the key pair used for signing user certificates and cross-domain certificates. In all, a management domain has four key pairs: (1) a key pair for signing managed objects, (2) a key pair for key transport used in securing client/server communications "over-the-wire", (3) a key pair for signing certificates, and (4) a key pair for key encoding for data recovery and passphrase reset.

The first management domain public key is, securely distributed to the client during an "activation protocol" between the identity and the management domain. The second public key is also sent during the "activation protocol", but is encapsulated in a certificate signed with the first key. The third and fourth public keys are subsequently sent in "certification/authentication" and "data recovery" policies, respectively. These latter two keys are also signed with the first (policy-signing) public key since they are packaged in a policy. Thus, the administrator who has access to the first public key is effectively the highest authority.

Figure 12A:
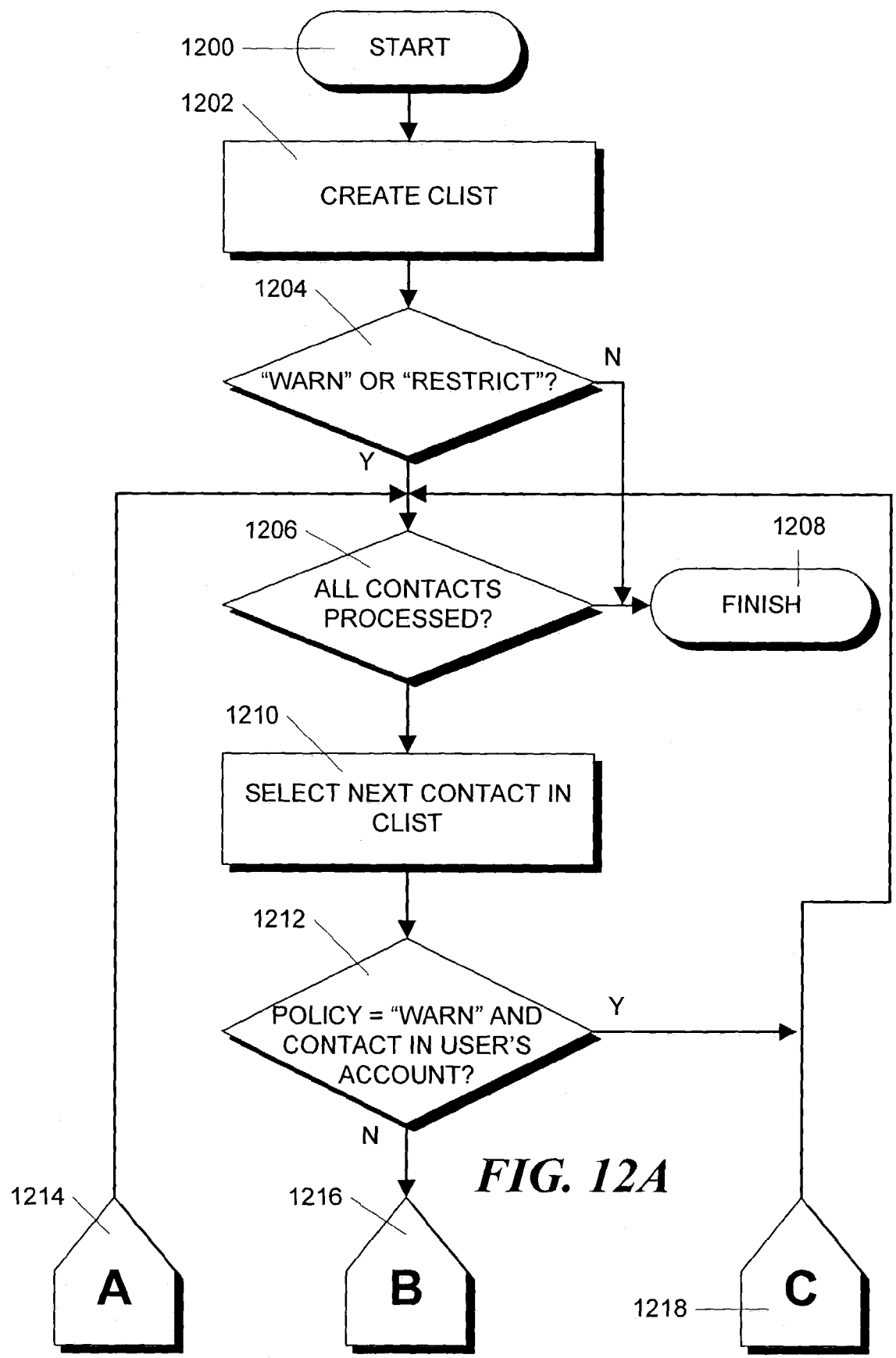
FIGS. 12A-12C, when placed together, form a flowchart that shows the steps in an illustrative process for compiling a list of unauthenticated and uncertified contacts.
Figure 12B:
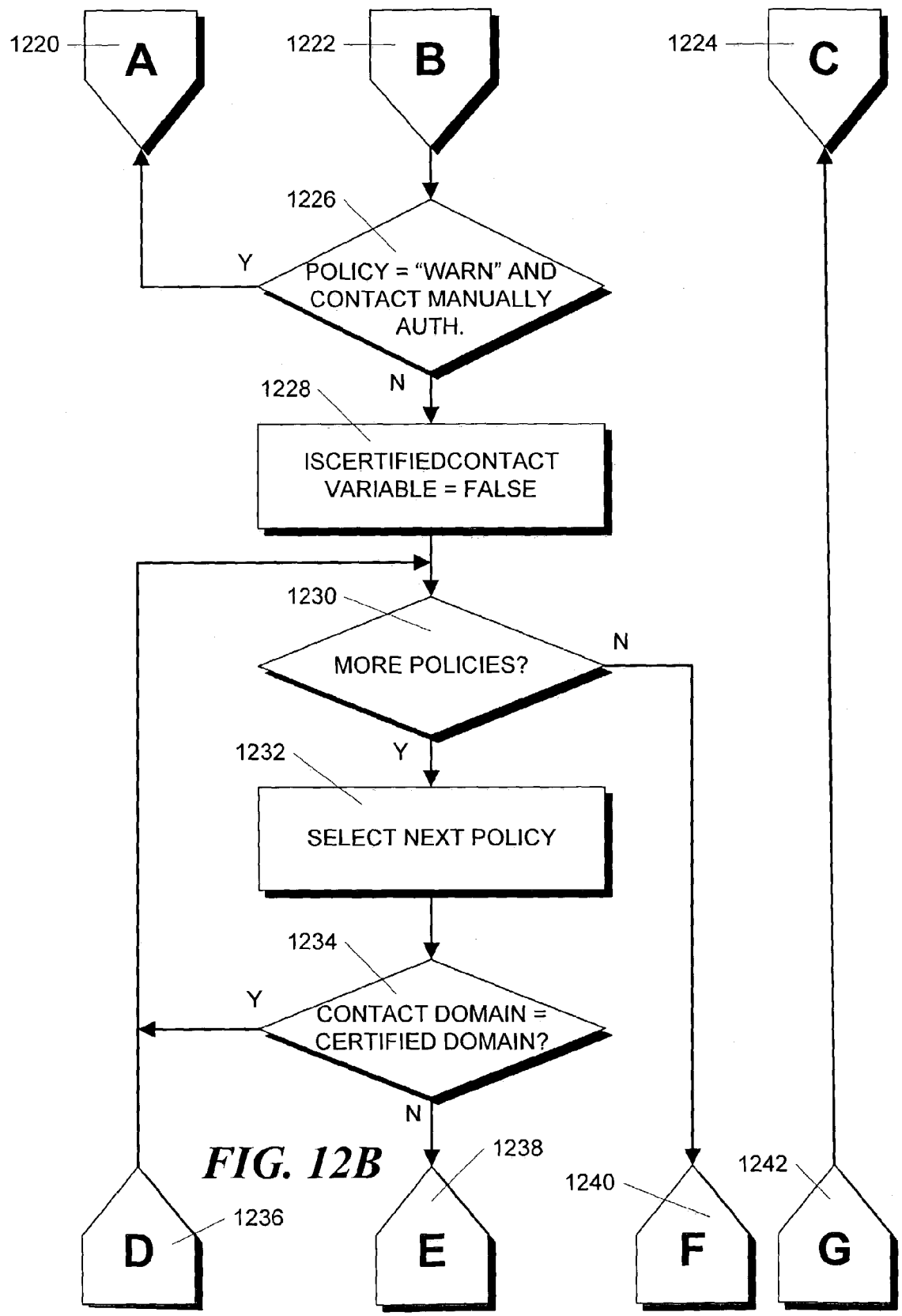
Figure 12C:
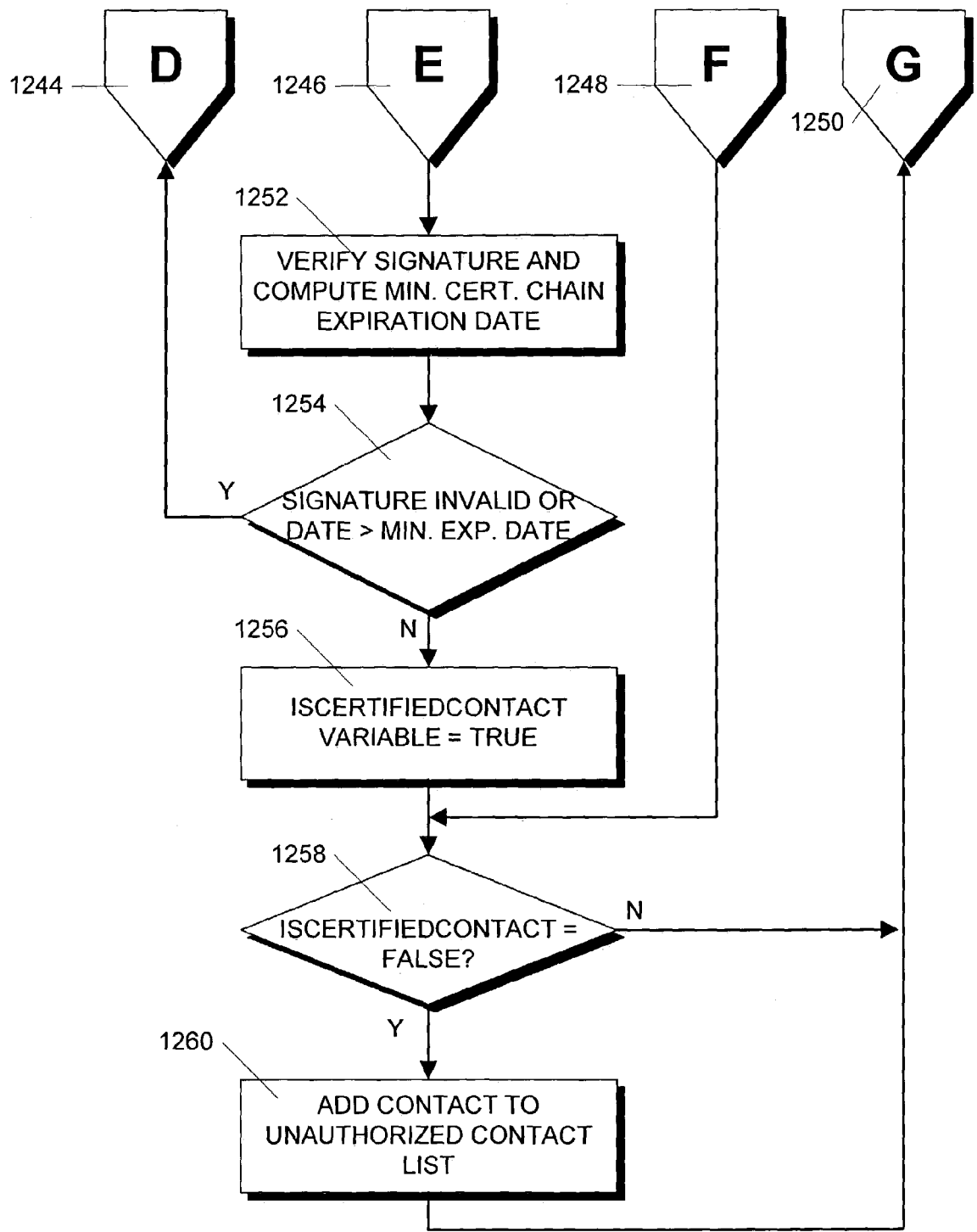

The process that is performed when an identity tries to communicate with another contact with a security policy in place is shown in the flowchart formed when FIGS. 12A-12C are placed together. This process begins in step 1200 and proceeds to step 1202 where the identity creates a list (called a "CList") of all the contacts to which the identity is trying to communicate. A determination is made in step 1204 whether the policy is set to "warn-if-unauthenticated" or "restrict-if-uncertified." If, in step 1204, it is determined that the policy is set to "warn-if-unauthenticated" or "restrict-if-uncertified", the client creates a list of all unauthenticated and uncertified contacts (called an "UnAuthList") of the contacts within the CList. Alternatively, if, in step 1204, it is determined that the policy is set to allow communications without warning or restriction, then the process proceeds to finish in step 1208.

To create the UnAuthList, the client enumerates and processes all of the contacts in the CList. In particular, the process proceeds to step 1206 where it is determined whether all contacts have been processed. If all contacts have been processed, the process finishes in step 1208 and the resulting UnAuthList is used to control communications in accordance with the policy in place as discussed above.

Alternatively, if it is determined in step 1206 that not all contacts have been processed, then, in step 1210, the next contact in the CList is selected. In step 1212, a determination is made whether the policy is set to "warn" and the contact is another identity in the user's account. If so, the contact is one of the account's identities and the process continues with the rest of the CList contacts by returning to step 1206 in order to determine whether all contacts have been processed. Alternatively, if, in step 1212, it is determined that the contact is not one of the account's identities, then the process proceeds, via off-page connectors 1216 and 1222, to step 1226 where a determination is made whether the policy is set to "warn" and the contact has been manually authenticated. A determination can be made whether the contact has been manually authenticated by examining the contact's manual authentication bit. If the contact has already been authenticated, then the process returns, via off-page connectors 1220 and 1214, back to step 1206 to determine whether any additional contacts on the CList remain to be processed.

If, in step 1226, it was determined that the contact was not already authenticated, then the process proceeds to step 1228 where the value of an IsCertifiedContact variable is set to FALSE. Then the process enumerates through all the cross-domain certification policies associated with the identity. In particular, in step 1230, a determination is made whether any additional cross-domain policies remain to be examined. If additional policies remain to be examined, then, in step 1232, the next policy is selected for examination.

In step 1234, a determination is made Whether the contact's management domain matches the domain certified in the policy. If not, the process proceeds back to step 1230 to determine if any more policies remain to be examined. If, in step 1234, it is determined that the contact's management domain matches the domain certified in the policy, then the process proceeds, via off-page connectors 1238 and 1246, to step 1252 where the signature on the contact's certificate is verified with the cross-certified domain's public key and a minimum certificate chain expiration date is computed.

Next, in step 1254, a determination is made whether the signature does not verify or the current date has exceeded the minimum expiration date. If so, the process proceeds, via off-page connectors 1244 and 1236 back to step 1230 where the process continues with the rest of the cross-domain policies.

Otherwise, the process proceeds to step 1256 where the variable IsCertifiedContact is set to TRUE indicating that the contact is certified. Then the process proceeds to step 1258 where a determination is made whether the value of the IsCertifiedContact is FALSE, indicating that the contact is not certified. The process also arrives at step 1258, via off-page connectors 1240 and 1248, after all policies have been examined as determined in step 1230.

If the contact is not certified as determined in step 1258, the contact is added to the unauthenticated and uncertified contact list (UnAuthList) in step 1260 and the process returns, via off-page connectors 1250 and 1242 and connectors 1224 and 1218, back to step 1206 to determine whether all contacts have been processed. Alternatively, if in step 1258 it is determined that the contact is certified, then the process skips step 1260 and proceeds directly back to step 1206 to determine if additional contacts remain to be processed.

After all contacts have been processed as determined in step 1206, the unauthenticated contact list (UnAuthList) is used in conjunction with the selected security to either warn the user if communication is attempted with an unauthenticated and uncertified user or to restrict the communication, as necessary.

A software implementation of the above-described embodiment may comprise a series of computer instructions, which may be fixed on a tangible medium, such as a computer readable storage media, for example, a diskette, a CD-ROM, a ROM memory, or a fixed disk. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, protocols and translations different from those shown may be performed. Other aspects, such as the specific process flow and the order of the illustrated steps, as well as other modifications to the inventive concept are intended to be covered by the appended claims.

What is claimed is:

1. A method of operating a computing device providing an endpoint in a peer-to-peer collaboration system in which each user has an identity and a display name, the method comprising:

in response to communicating with a first user, recording the first user as a contact in a contact data store in memory associated with the computing device, the recording comprising storing at least an identity and display name of the first user;

in response to receiving a communication from a second user:

determining whether the display name of the second user is equivalent to the display name of a user in the contact data store; and when the display name of the second user is equivalent to the display name of a user in the contact data store, and the identity of the second user is different than the identity of the user in the contact data store with the matching display name, generating a warning on a display associated with the computing device, wherein generating the warning comprises generating a warning about a potentially masquerading user having a display name equivalent to the display name of the user in the contact data store with the matching display name, the potentially masquerading user selected from a set of users having display names equivalent to the display name of the user in the contact data store with the matching display name, the set including the user in the contact data store with the matching display name, and the potentially masquerading user being selected based on relative authorization levels of the users in the set, wherein:

the warning comprises a name conflict indicator displayed in a first graphical user interface to the computing device indicating a conflict with a conflicted display name, the conflicted display name being the display name common to the second user and the user in the contact data store with the matching display name; and the method further comprises:

in response to user input received through the first graphical user interface, the user input being associated with the name conflict indicator, displaying on the computing device a plurality of equivalent display names that are equivalent to the conflicted display name;

receiving user input from a user of the computing device specifying an alternative display name for a selected display name, the alternative display name being selected by the user from the plurality of equivalent display names displayed on the computing device, the alternative display name being associated with a selected identity and being different than the conflicted display name; and identifying on a second graphical user interface of the computing device the selected identity with the alternative display name, the second graphical user interface providing a function related to controlling communication within the peer-to-peer collaboration system, the communication being between the computing device and a second device associated with the selected identity.

2. The method of claim 1 wherein determining whether the display name of the second user is equivalent to the display name of the contact stored in the contact data store comprises computing a clean name from each display name and comparing clean names of the two display names.

3. The method of claim 1 wherein generating a warning comprises displaying a name conflict indicator next to each display name associated with a contact identity whose authentication level (1) is less than the highest authentication/certification level of all contact identities with equivalent display names or (2) equals the highest authentication/certification level of all contact identities with an equivalent display name and at least one other contact identity with an equivalent display name has been identified having an equal authentication level.

4. The method of claim 1 further comprising:

preventing a user from communicating with another user based on a security policy when the other user has a predetermined authentication level.

5. The method of claim 1 wherein generating the warning comprises displaying a dialog box having all display names that are equivalent to the display name of the second user listed therein.

6. The method of claim 1 wherein the step of receiving user input comprises assigning the alternative display name as an alias to the selected display name which alias is not equivalent to either of the conflicted display name and the selected display name and which alias replaces the selected display name.

7. The method of claim 1 wherein displaying the warning comprises:

displaying an authentication indicator next to a display name that is not equivalent to another display name, which authentication indicator displays the authentication level of the associated contact.

8. The method of claim 1, further comprising, for each of a plurality of instances of the display name of the second user appearing on a display screen of the computing device, displaying the warning in conjunction with the display name.

9. The method of claim 1, wherein generating the warning in conjunction with the display name comprises displaying an icon adjacent an instance of the display name.

10. The method of claim 1, flirt her comprising:

upon receiving a communication from a new user for which there is no entry in the contact data store, making an entry for the new user in the contact data store, the making an entry comprising displaying a graphical user interface presenting information about the new user and containing an input area adapted to receive input from a user of the computing device authenticating the new user.

11. The method of claim 7 wherein each contact can have one of a predetermined number of authentication levels and wherein the authentication indicator that is displayed is unique to one of the authentication levels.

12. The method of claim 8, wherein at least one of the plurality of instances comprises a listing of contacts in a graphical user interface adapted to receive user input selecting a contact with which to communicate.

13. The method of claim 10, wherein:

when the input from the user of the computing device authenticating the new user is received, storing in the entry for the new user an indication that the new user is authenticated; and when the input from the user of the computing device authenticating the new user is not received, storing in the entry for the new user an indication that the new user is unauthenticated.

14. A method of operating a computing device providing an endpoint in a peer-to-peer collaboration system in which each user has an identity and a display name, the method comprising:

receiving an input setting a security policy from a user of the computing device and/or a system administrator;

in response to an event that triggers a function that includes display of a display name of a first user:

determining an authentication level of the first user, the authentication level comprising an authentication level being selected from a set comprising a certified level, an authenticated level, and an unauthenticated level, the certified level being higher then the authenticated level and the authenticated level being higher than the unauthenticated level;

selectively responding to the event based on the authentication level and the security policy, the security policy having at least an allow option, a restrict option and a warn option, and the selectively responding comprising:

when the security policy option is determined to be allow, presenting on a graphical user interface the display name of the first user in conjunction with performance of the function in response to the event;

when the security policy option is determined to be warn and the authentication level is less than or equal to a threshold level, presenting on the graphical user interface the display name of the first user in conjunction with performance of the function, the presenting including presenting a warning on the authentication level of the first user; and when the security policy option is set to restrict and the authentication level is less than or equal to the threshold level, omitting performance of the function.

15. The method of claim 14 wherein receiving an input setting a security policy comprises receiving from a user of the computing device the input setting the security policy.

16. The method of claim 14 wherein receiving an input setting a security policy comprises receiving from a system administrator the input setting the security policy.

17. The method of claim 14 wherein selectively responding to the event comprises warning a user when the security policy is set to warn and the user attempts to communicate with an unauthenticated and uncertified contact.

18. The method of claim 14 wherein selectively responding to the event comprises preventing a user from communicating with an uncertified contact when the security policy is set to restrict and the user attempts to communicate with an uncertified contact.

19. The method of claim 14 wherein selectively responding to the event comprises allowing a user to communicate with an unauthenticated and uncertified contact when the security policy is set to allow without warning and the user attempts to communicate with an unauthenticated and uncertified contact.

20. The method of claim 14 wherein determining the authentication level of the first user comprises:

compiling a contact list of contacts;

checking the contact list to determine contacts that are not authenticated;

checking the unauthenticated contacts to determine whether a certification policy applies to any unauthenticated contact; and placing an unauthenticated contact on the list of unauthenticated and uncertified contacts when no certification policy applies to that contact.

21. The method of claim 14, wherein the threshold level is determined dynamically based on an authentication level of at least one other user having a display name equivalent to the display name of the first user.

22. The method of claim 14, wherein the selectively responding comprises processing the event based on the authentication level and a security policy and the nature of the response to the event.

23. The method of claim 14, further comprising:

upon receiving a communication from a new user for which there is no entry in a contact data store, making an entry for the new user in the contact store, the making an entry comprising displaying a graphical user interface presenting information about the new user and containing an input area through which a user of the computing device can authenticate the new user.

24. The method of claim 14, wherein the event comprises receiving a communication from the first user.

25. The method of claim 14, wherein the event comprises receiving user input including a command to initiate communication with a user.

26. A computer readable storage medium storing computer-executable instructions that, when executed on a computing device providing an endpoint in a peer-to-peer collaboration system in which each user has an identity and a display name, perform a method comprising:

receiving an input setting a security policy from a user of the computing device and/or a system administrator;

in response to an event that triggers a function that includes display of a display name of a first user:

determining an authentication level of the first user, the authentication level comprising an authentication level being selected from a set comprising a certified level, an authenticated level, and an unauthenticated level, the certified level being higher then the authenticated level and the authenticated level being higher than the unauthenticated level;

selectively responding to the event based on the authentication level and the security policy, the security policy having at least an allow option, a restrict option and a warn option, and the selectively responding comprising:

when the security policy option is determined to be allow, presenting on a graphical user interface the display name of the first user in conjunction with performance of the function in response to the event;

when the security policy option is determined to be warn and the authentication level is less than or equal to a threshold level, presenting on the graphical user interface the display name of the first user in conjunction with performance of the function, the presenting including presenting a warning on the authentication level of the first user, wherein when the first user is not determined to be certified, the method comprises:

displaying a graphical user interface presenting information about the first user and containing an input area adapted to receive input from a user of the computing device authenticating the first user;

when input is received from the user of the computing device authenticating the first user, determining that the first user has an authentication level of authenticated; and when input is not received from the user of the computing device authenticating the first user, determining that the first user has an authentication level of unauthenticated; and when the security policy option is set to restrict and the authentication level is less than or equal to the threshold level, omitting performance of the function.

27. A computer readable storage medium storing computer-executable instructions that, when executed on a computing device providing an endpoint in a peer-to-peer collaboration system in which each user has an identity and a display name, perform a method comprising:

in response to an event adapted to trigger a function associated with a first user different than a user of the computing device:
: determining an authentication level of the first user, the authentication level comprising an authentication level being selected from a set comprising a certified level, an authenticated level, and an unauthenticated level, the certified level being higher then the authenticated level and the authenticated level being higher than the unauthenticated level;
: selectively responding to the event based on the authentication level and a security policy, the security policy having at least an allow option, a restrict option and a warn option, and the selectively responding comprising:
:: when the security policy option is set to restrict and the authentication level is less than or equal to a threshold level, blocking performance of the function; and
:: when the security policy option is determined to be warn and the authentication level is less than or equal to the threshold level, presenting on a graphical user interface the display name of the first user in conjunction with performance of the function in response to the event, the presenting including presenting a warning on the authentication level of the first user, wherein:
the authentication level comprises an authentication level selected from a set comprising a certified level, an authenticated level, and an unauthenticated level, the certified level being higher then the authenticated level and the authenticated level being higher than the unauthenticated level; and
the method further comprises:
: when the first user is not determined to be certified:
:: displaying a graphical user interface presenting information about the first user and containing an input area adapted to receive input from a user of the computing device authenticating the first user;
:: when input is received from the user of the computing device authenticating the first user, determining that the first user has an authentication level of authenticated; and
:: when input is not received from the user of the computing device authenticating the first user, determining that the first user has an authentication level of unauthenticated.

28. The computer readable storage medium of claim 27, wherein determining the authentication level of the first user comprises accessing a contact data store in memory associated with the computing device.

29. The computer readable storage medium of claim 28, wherein the method further comprises, prior to the event, in response to communicating with the first user, recording the first user as a contact in the contact data store, the recording comprising storing at least an identity, display name and authentication level of the first user.

30. The computer readable storage medium of claim 29, wherein determining the authentication level of the first user further comprises:
: displaying a graphical user interface presenting information about the first user and containing an input area adapted to receive input from the user of the computing device authenticating the first user; and
: when input is received from the user of the computing device authenticating the first user, determining that the first user has an authentication level of authenticated.

31. The computer readable storage medium of claim 29, wherein determining the authentication level of the first user further comprises:
: receiving information on authentication level of users of the peer-to-peer collaboration system from a network administrator; and
: when the received information comprises an indication that the first user is certified, determining that the authentication level of the first user is certified.

* * * * *